(12) United States Patent
Yamaga

(10) Patent No.: US 12,299,797 B2
(45) Date of Patent: May 13, 2025

(54) INFORMATION PROCESSING SYSTEM, INFORMATION PROCESSING METHOD, AND COMPUTER PROGRAM

(71) Applicant: GREE, Inc., Tokyo (JP)

(72) Inventor: Keisuke Yamaga, Tokyo (JP)

(73) Assignee: GREE, INC., Tokyo (JP)

( * ) Notice: Subject to any disclaimer, the term of this patent is extended or adjusted under 35 U.S.C. 154(b) by 266 days.

(21) Appl. No.: 18/147,982

(22) Filed: Dec. 29, 2022

(65) Prior Publication Data

US 2023/0290033 A1    Sep. 14, 2023

(30) Foreign Application Priority Data

Jan. 27, 2022    (JP) .................................. 2022-010558

(51) Int. Cl.
  *G06T 13/80*    (2011.01)
  *G06F 3/04817*    (2022.01)
  (Continued)

(52) U.S. Cl.
  CPC .......... *G06T 13/80* (2013.01); *G06F 3/04817* (2013.01); *G06F 3/0483* (2013.01);
  (Continued)

(58) Field of Classification Search
  CPC ........ G06T 13/80; G06V 10/56; G06V 10/54; G06F 3/04817; G06F 3/0483; G06F 3/04842
  See application file for complete search history.

(56) References Cited

U.S. PATENT DOCUMENTS

| 2015/0149939 A1* | 5/2015 | Mayblum | ......... | H04M 1/72427 715/765 |
| 2016/0184708 A1* | 6/2016 | Ziaja | .................. | H04N 21/2407 463/31 |

(Continued)

FOREIGN PATENT DOCUMENTS

| JP | 202017358 A | 1/2020 |
| JP | 202046732 A | 3/2020 |

(Continued)

OTHER PUBLICATIONS

Blaisdale ("Second Life | Style your Avatar! | New Releases & Free Gifts", 2021, https://www.youtube.com/watch?v=9ZqL5KQVzhs ) (Year: 2021).*

(Continued)

*Primary Examiner* — Xin Sheng
(74) *Attorney, Agent, or Firm* — Maier & Maier, PLLC

(57) ABSTRACT

An improved acquisition means for elements to be displayed in a user terminal, which may include a distribution circuit, a determination circuit configured to determine a predetermined part from a selection thereof, an association circuit, a first condition determination circuit configured to determine whether a first specific condition relevant to a distribution user is satisfied, and a change screen display circuit configured to display a change screen for changing the predetermined part to another part. The predetermined part may be changed on a distribution user terminal of the distribution user when the first condition determination circuit determines that the first specific condition is satisfied. The association circuit may be configured to associate the another part with the user information, and cancel the association of the predetermined part with the user information. The first specific condition may be satisfied when a (Continued)

specific electronic medium is associated with the user information.

15 Claims, 16 Drawing Sheets

(51) Int. Cl.
    *G06F 3/0483*     (2013.01)
    *G06F 3/04842*     (2022.01)
    *G06V 10/54*     (2022.01)
    *G06V 10/56*     (2022.01)

(52) U.S. Cl.
    CPC .......... *G06F 3/04842* (2013.01); *G06V 10/54* (2022.01); *G06V 10/56* (2022.01)

(56) References Cited

U.S. PATENT DOCUMENTS

| | | | |
|---|---|---|---|
| 2021/0065421 A1 | 3/2021 | Kurabuchi | |
| 2022/0292791 A1* | 9/2022 | Makeev | G06T 19/20 |

FOREIGN PATENT DOCUMENTS

| | | |
|---|---|---|
| JP | 2021005768 A | 1/2021 |
| JP | 202121987 A | 2/2021 |
| JP | 2021033980 A | 3/2021 |

OTHER PUBLICATIONS

SharkBlox ("My avatar changes outfit every time I reset", 2019, https://www.youtube.com/watch?v=mXoCi7tJDn4 ) (Year: 2019).*

Office Action issued on Mar. 19, 2024, in corresponding Japanese Application No. 2023-020446, 6 pages.

Office Action issued on Dec. 19, 2023, in corresponding Japanese Application No. 2023-020446, 5 pages.

Office Action issued on Sep. 6, 2022, in corresponding Japanese Application No. 2022-010558, 4 pages.

"DarkAvenger X"—Official service will start on Feb. 13 (Wednesday)! A campaign will be held where you can get additional rewards such as "dyeing tickets", Feb. 8, 2019, 7 pages URL:https://game.boom-app.com/entry/dax-news20190208 Machine translation attached.

Shinokumo, "How to make and dye costumes! Introducing how to get fabric materials", Jul. 2, 2021, 22 pages URL:https://gameappch.com/ninokuro/archive/?num=240 Machine translation attached.

* cited by examiner

INFORMATION PROCESSING SYSTEM, INFORMATION PROCESSING METHOD, AND COMPUTER PROGRAM

FIELD

The present invention relates to an information processing system, an information processing method, and a computer program.

BACKGROUND

Recently, users have performed avatar distribution in which a user distributes a video by using an avatar character that is the own avatar of the user.

For example, it may be contemplated for a user to generate an avatar character by combining favorite parts.

SUMMARY

The parts of the avatar character may include parts that are available by a drawing such as gatcha at a predetermined probability, in addition to parts that are provided without any charge, but it is extremely difficult to acquire these additional parts by drawing them according to a set probability.

Accordingly, an object of the present disclosure is to provide a technical improvement for solving or lessening at least a part of the problems of the related art described above. One of the more specific objects of the disclosure is to provide an information processing system, an information processing apparatus, an information processing method, and a computer program with extended acquisition means for parts.

An information processing system in the disclosure may be an information processing system including one or a plurality of computer processors, in which the one or the plurality of computer processors include: a distribution circuit transmitting information relevant to a video including a character object of a distribution user to a viewing user terminal to display the video on the viewing user terminal; a determination circuit determining a predetermined part from a plurality of parts wearable by the character object in accordance with a predetermined method, based on an input of the distribution user; an association circuit associating the predetermined part determined by the determination circuit with user information of the distribution user; a first condition determination circuit determining whether a first specific condition relevant to the distribution user is satisfied; and a change screen display circuit displaying a change screen for changing the predetermined part determined by the determination circuit or the predetermined part associated by the association circuit to another part in which a part of the predetermined part is changed on a distribution user terminal of the distribution user when the first condition determination circuit determines that the first specific condition is satisfied, the association circuit associates the another part changed based on the input of the distribution user with respect to the change screen with the user information, and cancels the association of the predetermined part with the user information, and the satisfaction of the first specific condition is that a specific electronic medium is associated with the user information.

Expiration date information and/or use frequency information can be associated with the specific electronic medium, and the association of the specific electronic medium with the user information may include that the electronic medium is within an expiration date and/or does not reach an upper limit of a use frequency.

The satisfaction of the first specific condition can be that the specific electronic medium is associated with the user information, and specific display for displaying the change screen is selected based on the input of the distribution user.

The specific display can be a check screen of whether to display the change screen.

The specific display can be an icon for displaying the change screen.

The predetermined part associated with the user information by the association circuit can be displayed to be selectable on a closet screen that can be displayed in the video, and when the predetermined part is selected on the closet screen, the icon can be displayed, or the icon displayed in advance can be highlighted.

The predetermined part associated with the user information by the association circuit and the icon can be displayed to be selectable on a closet screen that can be displayed in the video, and when the icon is selected on the closet screen, parts other than the predetermined part associated with the user information by the association circuit can be displayed to be unselectable.

The another part in which a part of the predetermined part is changed can be displayed to be selectable on the change screen.

Attribute information can be further associated with the specific electronic medium, and the another part in which a part of the predetermined part is changed can be displayed to be selectable on the change screen, based on the attribute information.

The another part can be a part with a color different from that of the predetermined part.

The another part can be a part in which a texture of the predetermined part is subjected to UV scroll.

When a character object of another user is included in the video, the determination circuit may be capable of determining a predetermined part from a plurality of parts wearable by the character object of the distribution user and/or the character object of the another user in accordance with a predetermined method, based on the input of the distribution user or the another user, and the association circuit may be capable of associating the predetermined part determined by the determination circuit with the user information of the distribution user and/or user information of the another user, and associating the another part changed based on the input of the distribution user or the another user with respect to the change screen with the user information of the distribution user and/or the user information of the another user, and canceling the association of the predetermined part with the user information of the distribution user and/or the user information of the another user.

The one or the plurality of computer processors may further include: a display request reception circuit receiving a display request for a gift that is transmitted from the viewing user terminal; an object display circuit displaying a gift object corresponding to the gift in the video, in accordance with the display request received by the display request reception circuit; a gift determination circuit determining whether the gift according to the display request received by the display request reception circuit is a specific gift; and a second condition determination circuit determining whether a second specific condition relevant to the distribution user or the viewing user is satisfied when the gift determination circuit determines that the gift is the specific gift, and when the second condition determination circuit determines that the second specific condition is satisfied, the display request reception circuit is capable of receiving the display request without reducing a point associated with the viewing user.

An information processing method in the disclosure may allow one or a plurality of computer processors to execute: a distribution step of transmitting information relevant to a video including a character object of a distribution user to a viewing user terminal to display the video on the viewing user terminal; a determination step of determining a predetermined part from a plurality of parts wearable by the character object in accordance with a predetermined method, based on an input of the distribution user; an association step of associating the predetermined part determined in the determination step with user information of the distribution user; a first condition determination step of determining whether a first specific condition relevant to the distribution user is satisfied; and a change screen display step of displaying a change screen for changing the predetermined part determined in the determination step or the predetermined part associated in the association step to another part in which a part of the predetermined part is changed on a distribution user terminal of the distribution user when it is determined that the first specific condition is satisfied in the first condition determination step, in which in the association step, the another part changed based on the input of the distribution user with respect to the change screen is associated with the user information, and the association of the predetermined part with the user information is canceled, and the satisfaction of the first specific condition is that a specific electronic medium is associated with the user information.

An information processing method in the disclosure may execute: a transmission step of transmitting information relevant to a video including a character object of a distribution user and information relevant to an input of the distribution user to a server apparatus; a reception step of receiving information relevant to a predetermined part determined from a plurality of parts wearable by the character object in accordance with a predetermined method, based on the input of the distribution user, from the server apparatus; an association step of associating the information relevant to the predetermined part received in the reception step with user information of the distribution user; a first condition determination step of determining whether a first specific condition relevant to the distribution user is satisfied; and a change screen display step of displaying a change screen for changing the determined predetermined part or the predetermined part associated in the association step to another part in which a part of the predetermined part is changed when it is determined that the first specific condition is satisfied in the first condition determination step, in which in the association step, the another part changed based on the input of the distribution user with respect to the change screen is associated with the user information, and the association of the predetermined part with the user information is canceled, and the satisfaction of the first specific condition is that a specific electronic medium is associated with the user information.

A computer program in the disclosure may attain: a transmission function of transmitting information relevant to a video including a character object of a distribution user and information relevant to an input of the distribution user to a server apparatus; a reception function of receiving information relevant to a predetermined part determined from a plurality of parts wearable by the character object in accordance with a predetermined method, based on the input of the distribution user, from the server apparatus; an association function of associating the information relevant to the predetermined part received by the reception function with user information of the distribution user; a first condition determination function of determining whether a first specific condition relevant to the distribution user is satisfied; and a change screen display function of displaying a change screen for changing the determined predetermined part or the predetermined part associated by the association function to another part in which a part of the predetermined part is changed when the first condition determination function determines that the first specific condition is satisfied, in which the association function associates the another part changed based on the input of the distribution user with respect to the change screen with the user information, and cancels the association of the predetermined part with the user information, and the satisfaction of the first specific condition is that a specific electronic medium is associated with the user information.

According to the disclosure, it may be possible to provide a technical improvement for solving or lessening at least a part of the problems of the related art described above. Specifically, according to the disclosure, it may be possible to provide an information processing system, an information processing apparatus, an information processing method, and a computer program with extended acquisition means for parts.

DETAILED DESCRIPTION

First, the outline of an information processing system according to embodiments of the disclosure will be described with reference to the drawings.

The information processing system in the disclosure may be an information processing system including one or more information processing apparatuses and a server apparatus, and may include one or a plurality of computer processors.

A video that may be displayed on each apparatus may be described as a video including the animation of a character object that is generated based on the motion of a distribution user, but is not limited thereto, and may be a video including the animation of the character object that is generated in accordance with the input of the distribution user, or may be a video including the own image of the distribution user. In addition, the video may be a video including only the voice of the distribution user without displaying the character object or the distribution user.

In addition, a space that is displayed in the video may be a virtual space, may be a reality space, or may be an augmented reality space in which the virtual space and the reality space are integrated. In addition, the video may be at least a karaoke video in which a predetermined set of visual elements and the voice of the distribution user are played back, or a live game video, or may be a video in which the actual image of the character object or the distribution user is displayed to be superimposed on the karaoke video or the live game video.

In addition, in a case where the distribution user is included in the reality space, the character object that is generated based on the motion of the distribution user may be displayed to be superimposed on the actual image of the distribution user. In addition, animation such as a gift object may be displayed to be superimposed on an image obtained by capturing the reality space.

<System Configuration>

Figure 1:
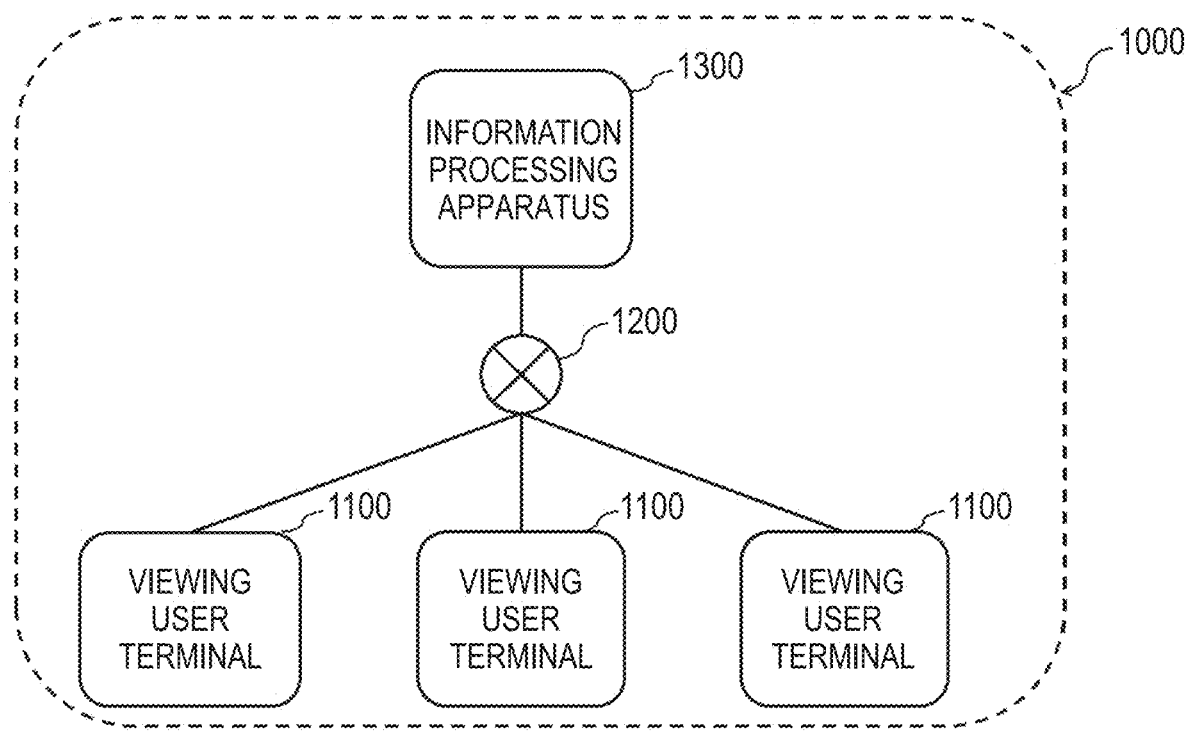
FIG. 1 is a system configuration diagram illustrating an example of an information processing system in the disclosure.

As illustrated in FIG. 1 as an example, an information processing system 1000 according to the disclosure may include one or more viewing user terminals 1100, and an information processing apparatus (a support computer) 1300 that is connected to the viewing user terminal 1100 through a network 1200 and is arranged in a video distribution studio, or the like.

In addition, the information processing apparatus 1300 may be connected to a predetermined server apparatus through the internet, and a part or all of the processing to be performed by the information processing apparatus 1300 may be performed by the server apparatus. Note that such a server apparatus may be an information processing apparatus 2400 illustrated in FIG. 2.

Herein, the distribution of such an information processing system 1000 will be referred to as a studio distribution.

In the studio distribution, the whole-body motion of the distribution user (an actor) is reflected on a character in real time by capturing markers attached to the distribution user with a camera provided in the studio using existing motion capture technology.

Figure 2:
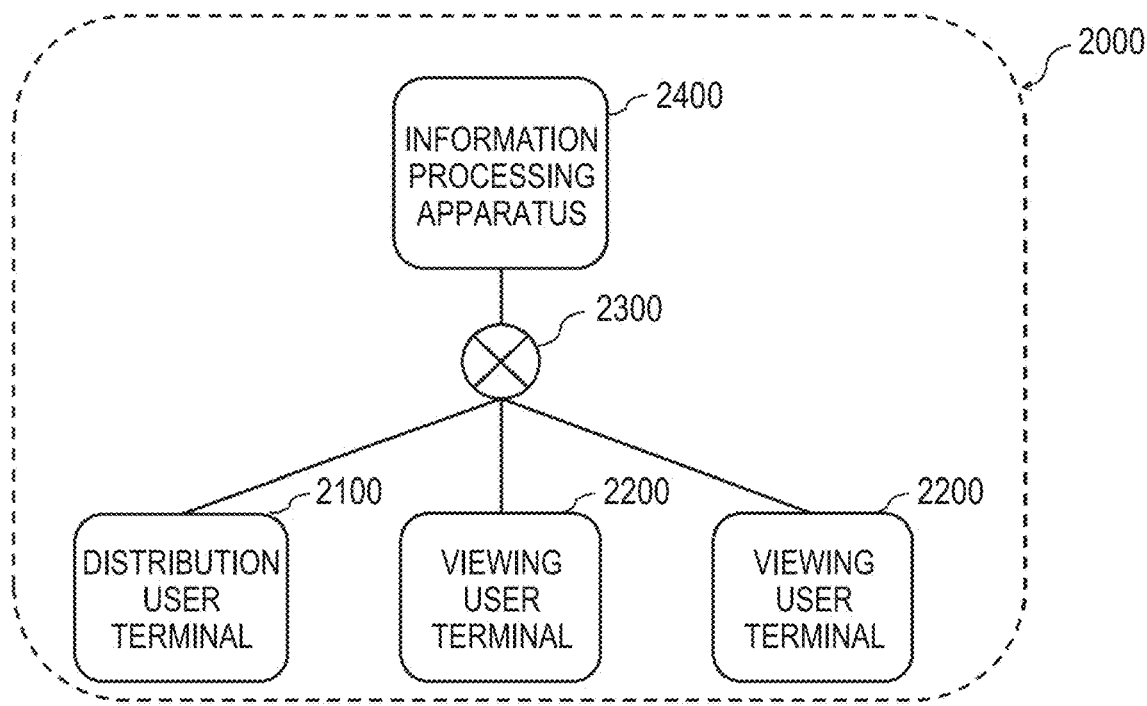
FIG. 2 is a system configuration diagram illustrating an example of the information processing system in the disclosure.

In addition, the information processing system 1000 according to an exemplary embodiment is capable of cooperating with another information processing system 2000 illustrated in FIG. 2, as an example. The information processing system 2000 illustrated in FIG. 2 may include a distribution user terminal 2100, one or more viewing user terminals 2200, and an information processing apparatus (a server apparatus) 2400 that is connected to the distribution user terminal 2100 and the viewing user terminal 2200 through a network 2300.

In the example described above, the distribution user terminal 2100 can be an information processing terminal such as a smart phone. Herein, the distribution of such an information processing system 2000 will be referred to as a mobile distribution.

In the mobile distribution, a face motion of the distribution user may be reflected on the face of the character in real time by capturing the face of the distribution user with a camera provided in the distribution user terminal 2100 using the existing face tracking technology.

Note that the distribution user and a viewing user in the mobile distribution may not be particularly distinguished, such that the viewing user may be capable of performing the mobile distribution at any time, and the distribution user can be the viewing user in the case of viewing videos of other distribution users.

The video that is generated by the information processing system 1000 and the information processing system 2000 can be distributed to the viewing user from one video distribution platform, as an example.

In addition, in any distribution, processing of generating the animation by reflecting the motion on the character, processing of displaying a gift described below, or the like may be performed by being shared in the distribution user terminal, the viewing user terminal, the information processing apparatus, and other apparatuses.

That is, here, the "distribution" indicates the transmission of information for enabling the viewing of the video on the terminal of the viewing user, and the rendering of the video may be performed on the information processing apparatuses 1300 and 2400 side, or may be performed on the distribution user terminal 2100 side and the viewing user terminals 1100 and 2200 side.

Specifically, face motion data and voice data of the distribution user may be transmitted to a terminal or an apparatus generating (rendering) the animation of the character object from the distribution user terminal or the information processing apparatus. In addition, a body motion may be transmitted, in addition to the face motion.

In the disclosure, the processing of generating the animation will be described as processing that may be performed by each of the distribution user terminal and the viewing user terminal, but is not limited thereto.

Figure 3:
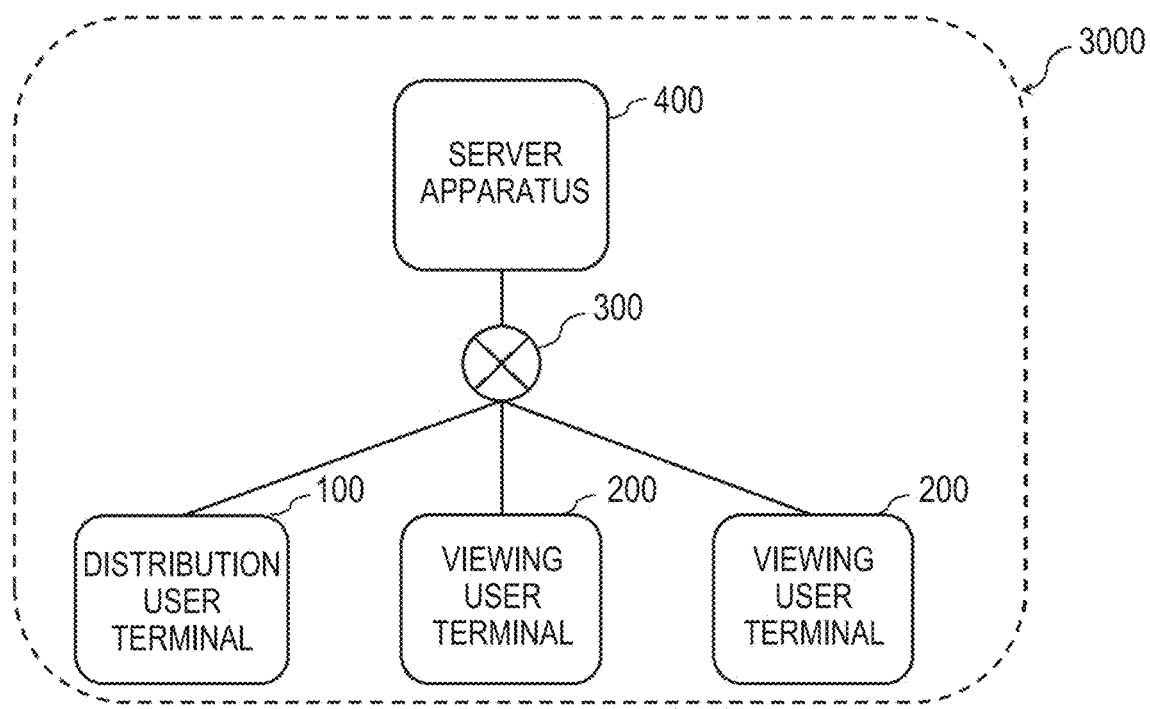
FIG. 3 is a system configuration diagram illustrating an example of the information processing system in the disclosure.

Then, the information processing system in the disclosure can also be applied to any of the examples illustrated in FIG. 1 and FIG. 2. Therefore, as illustrated in FIG. 3, an information processing system 3000 in the embodiments of the disclosure may be described as an information processing system including a distribution user terminal 100, a viewing user terminal 200, and a server apparatus 400 that can be connected to the distribution user terminal 100 and the viewing user terminal 200 through a network 300.

The distribution user terminal 100 may function at least as the information processing apparatus 1300 or the distribution user terminal 2100 described above, the viewing user terminal 200 may function at least as one or more viewing user terminals 1100 and 2200 described above, and the server apparatus 400 may function at least as the predetermined server apparatus or the information processing apparatus 2400 described above.

In the disclosure, the distribution user terminal 100 and the viewing user terminal 200 can be a smart phone (a multifunctional telephone terminal), a tablet terminal, a personal computer, a game console, a wearable computer such as a head-mounted display (HMD) and a spectacles-type wearable terminal (such as AR glass), and an information processing apparatus that is capable of playing back the video, other than the apparatuses described above. In addition, such terminals may be a stand-alone apparatus that is operated alone, or may include a plurality of apparatuses that are connected to each other such that various data pieces can be transmitted and received.

<Hardware Configuration>

Figure 4:
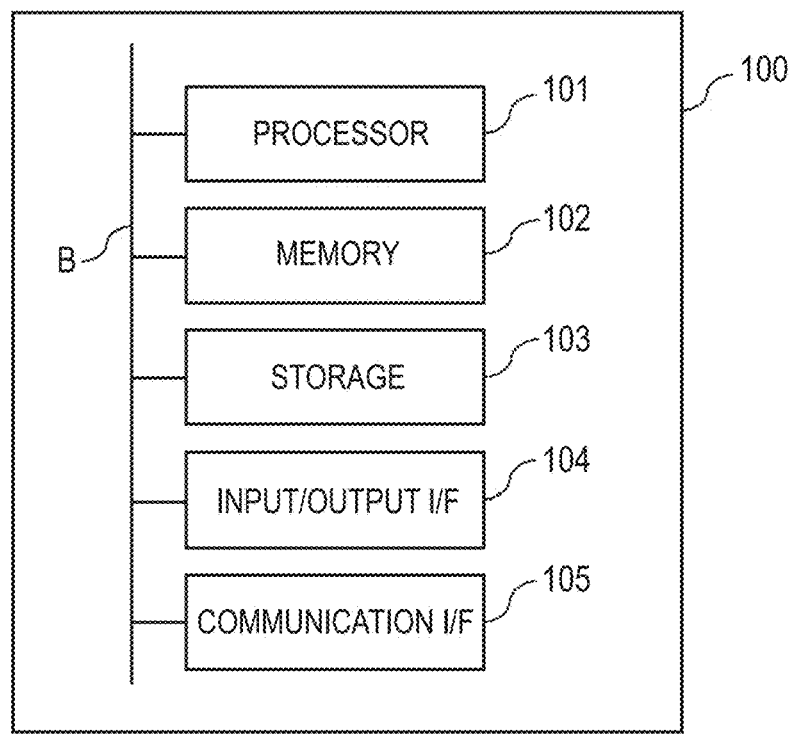
FIG. 4 is a configuration diagram illustrating an example of a hardware configuration of a server apparatus, a distribution user terminal, and a viewing user terminal in the disclosure.

Here, a hardware configuration of the distribution user terminal 100 may be described by using FIG. 4. The distribution user terminal 100 may include a processor 101, a memory 102, a storage 103, an input/output interface (an input/output I/F) 104, and a communication interface (a communication I/F) 105. The constituents may be connected to each other through a bus B.

The distribution user terminal 100 may be capable of attaining functions and methods described in this embodiment, in cooperation with the processor 101, the memory 102, the storage 103, the input/output I/F 104, and the communication I/F 105.

The processor 101 may execute a function and/or a method attained by a code or a command included in a program that is stored in the storage 103. The processor 101, for example, may include a central processing device (CPU), a micro processing unit (MPU), a graphics processing unit (GPU), a microprocessor, a processor core, a multiprocessor, an application-specific integrated circuit (ASIC), a field programmable gate array (FPGA), and the like, and each processing disclosed in each embodiment may be attained by a logic circuit (hardware) formed in an integrated circuit (IC) chip, large scale integration (LSI), or the like or a dedicated circuit. In addition, such circuits may be attained by one or a plurality of integrated circuits, and a plurality of processings described in each embodiment may be attained by one integrated circuit. In addition, LSI may be referred to as VLSI, super LSI, ultra LSI, and the like, in accordance with a difference in an integration degree.

The memory 102 transitorily stores a program that is loaded from the storage 103, and provides a workspace to the processor 101. The memory 102 also transitorily stores various data pieces that may be generated while the processor 101 may execute the program. The memory 102, for example, may include a random access memory (RAM), a read only memory (ROM), and the like.

The storage 103 may store a program. The storage 103, for example, may include a hard disk drive (HDD), a solid state drive (SSD), a flash memory, and the like.

The communication I/F 105 may be mounted as hardware such as a network adapter, communication software, and a combination thereof, and transmits and receives various data pieces through the network 300. The communication may be executed in a wired or wireless manner, and any communication protocol may be used insofar as the communication can be executed to each other. The communication I/F 105 may execute communication with respect to other information processing apparatuses through the network 300. The communication I/F 105 may transmit various data pieces to other information processing apparatuses, in accordance with an instruction from the processor 101. In addition, the communication I/F 105 may receive various data pieces transmitted from other information processing apparatuses, and may transmit the data to the processor 101.

The input/output I/F 104 may include an input device providing various inputs with respect to the distribution user terminal 100, and an output device outputting a processing result obtained by the processing of the distribution user terminal 100. In the input/output I/F 104, the input device and the output device may be integrated, or the input device and the output device may be separated.

The input device may be or may include any or all types of devices capable of receiving input from a user and transmitting information according to the input to the processor 101, or a combination thereof. The input device, for example, may include a touch panel, a touch display, a hardware key such as a keyboard, a pointing device such as a mouse, a camera (input provided via an image), and a microphone (input provided using a voice).

The input device may include a sensor circuit. The sensor circuit may be one or more sensors detecting a face motion indicating a change in the neutral expression of the user and a body motion indicating a change in a relative position of the body of the user with respect to the sensor circuit. The face motion may include a motion such as blinking or opening and closing of the mouth. As the sensor circuit, a known product can be used. An example of the sensor circuit may include a ToF sensor measuring and detecting time of flight until light applied toward the user is reflected on the face or the like of the user and returned, a camera capturing the face of the user, and an image processing circuit performing image processing with respect to data captured by the camera. In addition, the sensor circuit may include an RGB camera imaging a visible light ray, and a near-infrared camera imaging a near-infrared ray. As the RGB camera or the near-infrared camera, for example, True Depth of the IPHONEX, LiDAR of the IPAD PRO, and other ToF sensors mounted on smart phones can be used. Specifically, such cameras project tens of thousands of invisible dots (points) to the face of the user by a dot projector. Then, reflected light of a dot pattern may be detected and analyzed, a depth map of the face may be formed, and an infrared image of the face or the like may be captured, and thus, accurate face data may be captured. An arithmetic processing circuit of the sensor circuit may generate various information pieces, based on the depth map and the infrared image, may compare the information with registered reference data, and may calculate the depth of each of the points on the face (a distance between each of the points and the near-infrared camera) and a positional shift other than the depth.

In addition, the sensor circuit may have a function of tracking not only the face of the user but also the hand (hand tracking). The sensor circuit may further include sensors such as an acceleration sensor or a gyroscope sensor, other than the sensors described above. The sensor circuit may have a space mapping function of recognizing an object in the reality space where the user exists, based on a detection result of the ToF sensor described above or other known sensors, and mapping the recognized object on a space map. Hereinafter, in a case where detection data of the face motion and detection data of the body motion may not be particularly distinguished, the detection data may be simply referred to as "tracking data". Note that, the image processing circuit of the sensor circuit may include a control circuit that can be provided in the information processing system according to an exemplary embodiment.

As an input circuit as the input device, an input circuit according to the type of user terminal can be used. An example of the input circuit is a touch panel integrated with a display, an input button provided in the housing or the like of the user terminal, a keyboard, a mouse, a controller that is manipulated by the user with the hand, and the like. Various known sensors such as an inertial measurement sensor (an inertial measurement unit: IMU) including an acceleration sensor and a gyroscope sensor may be built in the controller. In addition, another example of the input circuit may be a tracking device specifying the motion of the hand of the user, the motion of the eyes, the motion of the head, the direction of the visual line, and the like. In such an aspect, for example, an instruction of the user may be determined, the distribution of the video may be started or ended, or various manipulations such as a message, the evaluation on the video, and a display request for a predetermined object (for example, a gift described below) can be executed, based on the motion of the hand of the user. Note that, in a case where the sensor circuit also has an input interface function such as the hand tracking function, the input circuit can be omitted. The output device may output the processing result obtained by the processing of the processor 101. The output device, for example, may include a touch panel, a speaker, and the like.

In addition, the viewing user terminal 200 and the server apparatus 400 in the disclosure may have the same hardware configuration as that illustrated in FIG. 4, unless otherwise noted.

Subsequently, various functions that can be executed in the user terminal in which an application attained by the information processing system in the embodiments of the disclosure is started, and the transition of a screen to be displayed may be described with reference to the drawings.

Figure 5:
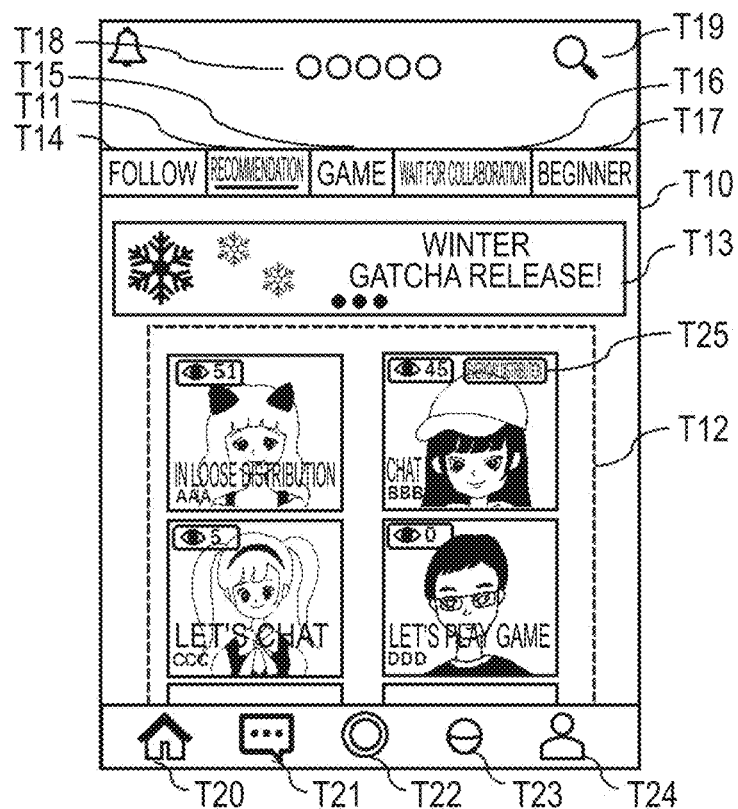
FIG. 5 is a conceptual diagram illustrating an exemplary image of a screen that is displayed on a user terminal.

FIG. 5 illustrates a top screen T10 that is displayed on the user terminal when starting a distribution/viewing application of the video (here, whether the user performs viewing/distribution is not yet specified).

As illustrated in FIG. 5, the user may select one distribution channel (referred to as a distribution frame, a distribution program, a distribution video, or the like) from thumbnail images of one or more recommended distribution channels T12 that may be displayed as a list in a recommendation tab T11 on the top screen T10, and thus, is capable of viewing a video that is played back by the distribution channel.

Alternatively, the user may access a fixed link of one specific distribution channel, and thus, is capable of viewing a video that is played back by the one specific distribution channel. Such a fixed link can be obtained by a notice from the distribution user whom the user is following, a share notification sent from other users, or the like. As described above, the user viewing the video is the viewing user, and the terminal viewing the video is the viewing user terminal 200.

In addition, as illustrated in FIG. 5, a display column T13 for a notice such as a campaign or an event may be displayed on the top screen T10. The display column T13 for a notice can be switched to the display of another notice by a slide manipulation.

Then, from the top screen T10, a follow tab T14, a game tab T15 for displaying a game category, a collaboration waiting tab T16 for displaying a distribution channel waiting for a collaboration, and a beginner tab T17 for displaying a distribution channel of a beginner may be displayed. By selecting such a tab (by switching the tab), the top screen T10 is transitioned to another screen.

Note that a service name display T18 and a search button T19 in the upper frame of the top screen T10 may be fixedly displayed on a transition destination screen.

Similarly, a home button T20, a message button T21, a distribution preparation button T22, a gatcha button T23, and a profile button T24 in the lower frame of the top screen T10 may be fixedly displayed on the transition destination screen.

On the top screen T10 and the like illustrated in FIG. 5, the user selecting the thumbnail image T12 to be displayed may be the viewing user viewing the video as described above, and the user selecting the distribution preparation button T22 may be the distribution user distributing the video.

Figure 6:
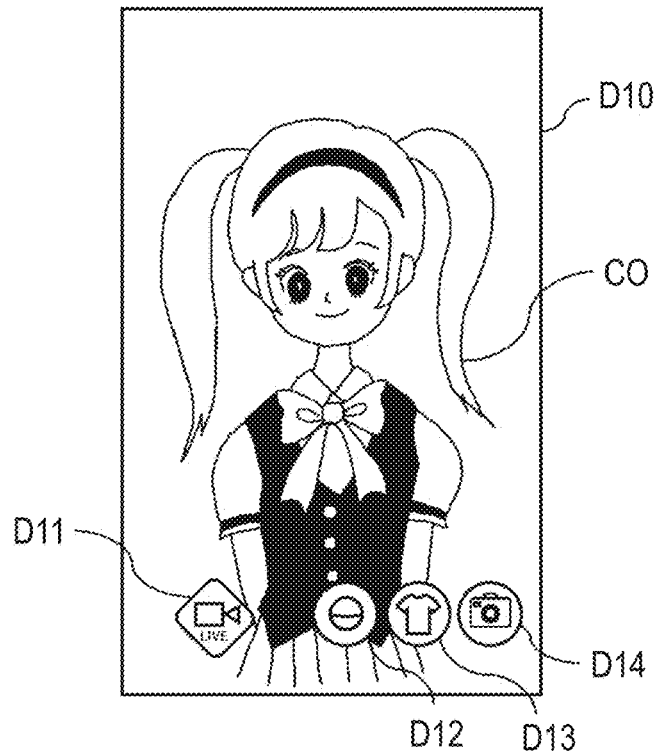
FIG. 6 is a conceptual diagram illustrating an exemplary image of the screen that is displayed on the user terminal.

As an example, in a case where the distribution preparation button T22 is selected on the top screen T10 illustrated in FIG. 5, the screen may be transitioned to an avatar setting screen D10 illustrated in FIG. 6. Then, in a case where a distribution button D11 is selected on the avatar setting screen D10, the screen may be transitioned to a distribution setting screen D20 illustrated in FIG. 7. Then, in a case where a distribution start button D25 is selected on the distribution setting screen D20, the screen may be transitioned to an avatar distribution screen D30 illustrated in FIG. 8.

Subsequently, the details of a flow until the distribution of the video is started may be described.

One or a plurality of computer processors in the disclosure may include a distribution start request reception circuit, a distribution setting circuit, and a distribution start circuit.

The distribution start request reception circuit may receive a distribution start request for a first video including the animation of the character object from the distribution user terminal of the distribution user.

Here, the first video may indicate the video including the animation of the character object. Note that, herein, the character object may be referred to as an "avatar".

Then, the distribution start request described above can be transmitted to the information processing apparatus 400 from the user terminal by selecting the distribution button D11 arranged on the avatar setting screen D10 or the like transitioned from the top screen described above that is displayed on the user terminal (to be the distribution user terminal later) in which a dedicated application (the distribution/viewing application of the video) for accessing the video distribution platform is started.

FIG. 6 illustrates an example of the avatar setting screen D10. On the avatar setting screen D10, a character object CO, a distribution button D11, a gatcha button D12, a clothing change button D13, a photo button D14, and the like can be displayed.

In a case where the clothing change button D13 is selected by the user, a closet screen for selecting various avatar parts such as the eyes, the nose, the mouth, the hair, the accessory, the clothes, and the background of the character object CO may be laid out. In a case where the gatcha button D12 is selected by the user, a drawing screen for acquiring the avatar parts described above may be laid out.

In a case where the photo button D14 is selected by the user, a capture screen for capturing a still image of the character object may be laid out.

Then, in a case where the distribution button D11 is selected by the user, the distribution start request may be transmitted to the information processing apparatus 400.

The distribution setting circuit may set distribution setting of the first video, based on the designation from the distribution user terminal 100, in accordance with the distribution start request for the first video that is received by the distribution start request reception circuit.

Figure 7:
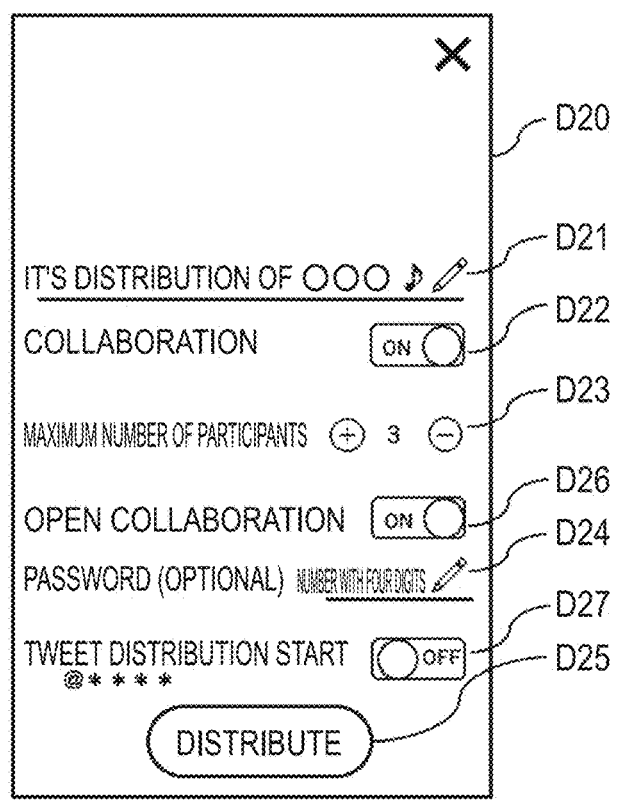
FIG. 7 is a conceptual diagram illustrating an exemplary image of the screen that is displayed on the user terminal.

As an example, in a case where the distribution button D11 is selected, the screen to be displayed on the distribution user terminal 100 may be transitioned to the distribution setting screen D20 illustrated in FIG. 7 from the avatar setting screen D10 illustrated in FIG. 6.

In the distribution setting, at least one of setting relevant to the title of the first video, setting relevant to appearance availability of other users in the first video, setting relevant to the number of people who can appear in the first video, and setting relevant to a password can be included.

Such distribution setting can be performed in each of a title setting column D21, a collaboration availability setting column D22, a number of people setting column D23, and a password setting column D24 in FIG. 7. Note that, in FIG. 7, an open collaboration availability setting column D26 and an SNS posting availability column D27 may be displayed.

The title of the first video can be freely determined by the distribution user within the range of the number of letters up to an allowable upper limit. Note that, in a case where there is no input from the distribution user, a title set in advance, including the name of the character object (the distribution user) such as "It's distribution of ooor", may be automatically determined.

The appearance availability of the other user in the first video can be freely determined by the distribution user. In a case where the appearance is available, the other user is capable of asking the distribution user for the appearance, and in a case where appearance is not available, the other user is not capable of asking the distribution user for the appearance. Herein, a state where the other user appears in the video of the distribution user may be referred to as a "collaboration". The details of the collaboration may be described below.

The number of people who can appear in the first video can be set only in a case where the appearance of the other user in the first video is available, and can be freely determined by the distribution user in the range of the number of people up to the allowable upper limit.

The password can be arbitrarily set only in a case where the appearance of the other user in the first video is available, and a number with the designated number of digits can be freely determined by the distribution user. When the other user asks for the appearance in the first video, the input of the password may be requested. Note that, only in a case where the open collaboration availability setting column D26 is OFF, the password setting column D24 may be active.

The distribution start circuit may distribute information relevant to the first video to the viewing user terminal 200 of the viewing user, based on a condition set by the distribution setting circuit.

Such a distribution start instruction is transmitted by the selection of the distribution start button D25 illustrated in FIG. 7.

As an example, the distribution start circuit may distribute the information relevant to the video (the first video) including the animation of the character object of the distribution user to the viewing user terminal 200 of the viewing user (performs avatar distribution).

The information relevant to the first video, for example, may include motion information indicating the motion of the character object, voice information of the distribution user, gift object information indicating a gift sent from other viewing users, and the like. Then, the gift object information may include at least gift object identification information for specifying the type of gift object, and position information indicating a position in which the gift object is displayed.

Then, the distribution start circuit may be capable of distributing the video live through the video distribution platform.

Figure 8:
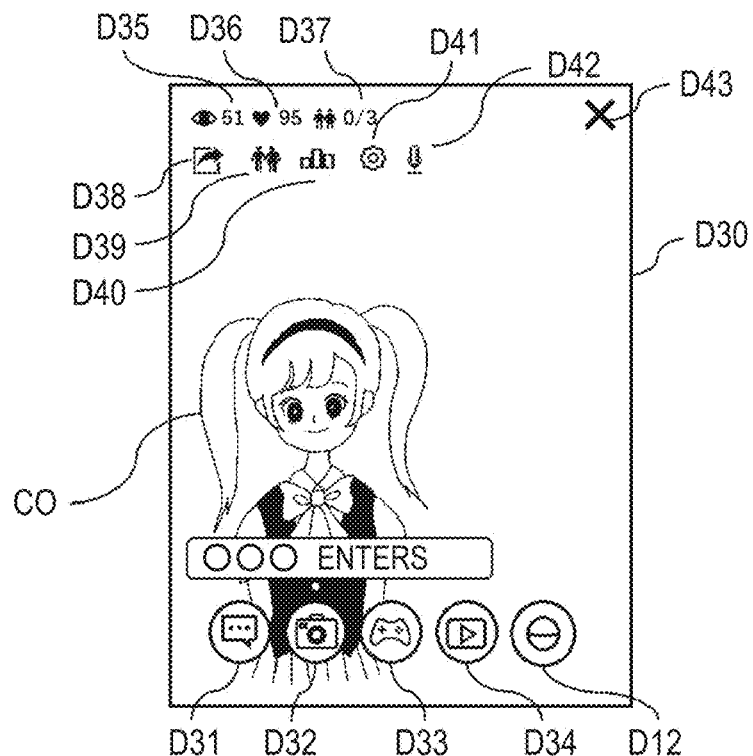
FIG. 8 is a conceptual diagram illustrating an exemplary image of the screen that is displayed on the user terminal.

FIG. 8 illustrates the avatar distribution screen D30 that may be displayed on the distribution user terminal 100.

On the avatar distribution screen D30, the character object CO may be displayed, and a comment input button D31 for the distribution user to input a comment, a photo button D32 for storing a still image of the screen, a play start button D33 for playing a game described below, an external service linkage button D34 for viewing a video that is provided by an external service, and the gatcha button D12 for acquiring the avatar parts can be displayed.

In addition, in the upper portion of the avatar distribution screen D30, cumulative number of viewers display D35, cumulative number of likes display D36, number of collaboration people display D37, a share button D38 for an external SNS, a guest details button D39, a ranking display button D40, a setting button D41, and a voice switch button D42 for switching ON/OFF of the voice can be displayed. In addition, an end button D43 for ending the distribution is also displayed.

The detailed description of the displays and the buttons is omitted, but the distribution setting set on the distribution setting screen D20 can be changed by the selection of the setting button D41.

Note that FIG. 8 illustrates an example in which the distribution may be started by setting the appearance of the other user in the first video to be available and the number of people who can appear in the first video to 3, and thus, the character object CO may be displayed on the lower left side, on the distribution setting screen D20. In the empty space, up to three character objects of the other users can appear.

The screen transition when performing the avatar distribution according to an exemplary embodiment in the disclosure has been described.

Subsequently, screen transition when the distribution user plays a game during the distribution may be described.

One or a plurality of computer processors in the disclosure may include a game request reception circuit, a game video distribution circuit, and a game display processing circuit.

The distribution user may be capable of performing a play start request for a game by selecting the play start button D33 in the middle of the avatar distribution as illustrated in FIG. 8.

Note that the game that may be displayed by the selection of the play start button D33 may be a dedicated game implemented on the application that is attained by the information processing system in the disclosure, and can be different from a versatile game that is provided by the external service. Accordingly, game distribution in the disclosure may be distinguished from the distribution of a play video of the versatile game provided by the external service that is performed together with the live commentary of the distribution user.

Alternatively, the play start request can be transmitted to the information processing apparatus 400 from the distribution user terminal 100 by selecting a play start button arranged on a predetermined screen that is displayed on the distribution user terminal 100 of the distribution user.

Figure 9:
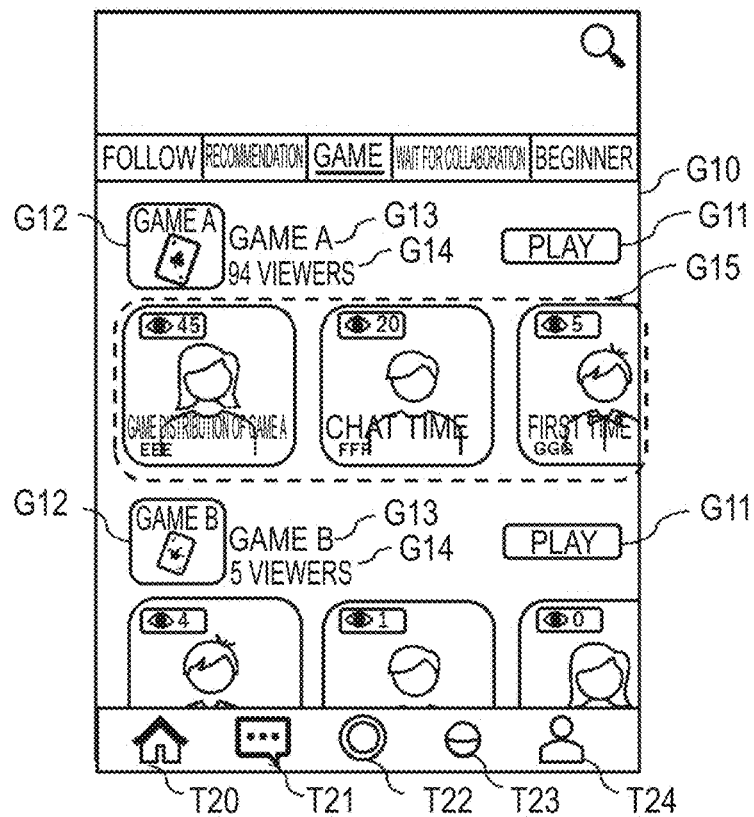
FIG. 9 is a conceptual diagram illustrating an exemplary image of the screen that is displayed on the user terminal.

FIG. 9 illustrates an example of a screen G10 on which a play start button G11 may be arranged, as the predetermined screen described above. The screen G10 illustrated in FIG. 9 is a screen that is transitioned by the selection of the game tab T15 from the top screen T10 (FIG. 5) displayed on the user terminal in which the application attained by the information processing system in the disclosure may be started.

On the screen G10, at least the play start button G11 that is capable of transmitting a play start request for a predetermined game is displayed.

Then, in a case where the game request reception circuit receives the play start request for the predetermined game, the game video distribution circuit may distribute information relevant to a second video to the viewing user terminal 200.

Here, the second video is a play video of the predetermined game. Herein, distribution in which such a video is displayed on the screen of the viewing user terminal 200 may be referred to as "game distribution".

In addition, after the application attained by an exemplary embodiment in the disclosure is started, the user may select a play start object arranged on a game list screen and a game details screen, and thus, may be capable of transmitting a distribution start request for the second video to the information processing apparatus 2400, as the distribution user.

The game list screen or the game details screen is a first screen described below.

That is, the game display processing circuit may perform display processing of the first screen including a distribution start object that is capable of transmitting the distribution start request, the play start object that is capable of transmitting the play start request for the predetermined game, and a thumbnail image of the video during the distribution of the play video of the predetermined game.

The screen G10 illustrated in FIG. 9 corresponds to the game list screen in the first screen. The first screen that is the game list screen is a screen that is transitioned by the selection of the game tab T15 from the top screen T10.

Such a first screen may include the distribution preparation button T22 as the distribution start object, the play start button G11 as the play start object, and the thumbnail image indicating the distribution channel of the video.

On the first screen, the play start button G11, a game icon G12, a game name G13, the total number G14 of viewers of the distribution channel of the game, and a distribution list G15 including the thumbnail image of the distribution channel during the game distribution may be respectively displayed, for each of a plurality of games that can be played.

Note that, here, a display order of the thumbnail image that is displayed in the distribution list G15 to be displayed can be changed by the viewing user. As an example, the thumbnail image may be arranged in priority order such as in descending order of the number of follows of the viewing users and the number of views of the viewing users, in descending order of the cumulative number of viewers, and in chronological order from the start of the distribution. Note that a display range of the thumbnail image of the distribution list G15 can be changed by horizontal scroll.

In addition, as the game displayed on the game list screen, top 10 titles with the following priority may be read. As an example, the priority may be set in reverse chronological order within 48 hours from a game distribution start date and within 30 days from a play date of the viewing user, in descending order of the priority of a period ID, and in descending order of the period ID.

The distribution list G15 may be updated in the case of returning from the screen of the other tab and when performing an update manipulation (pull-to-refresh).

Figure 10:
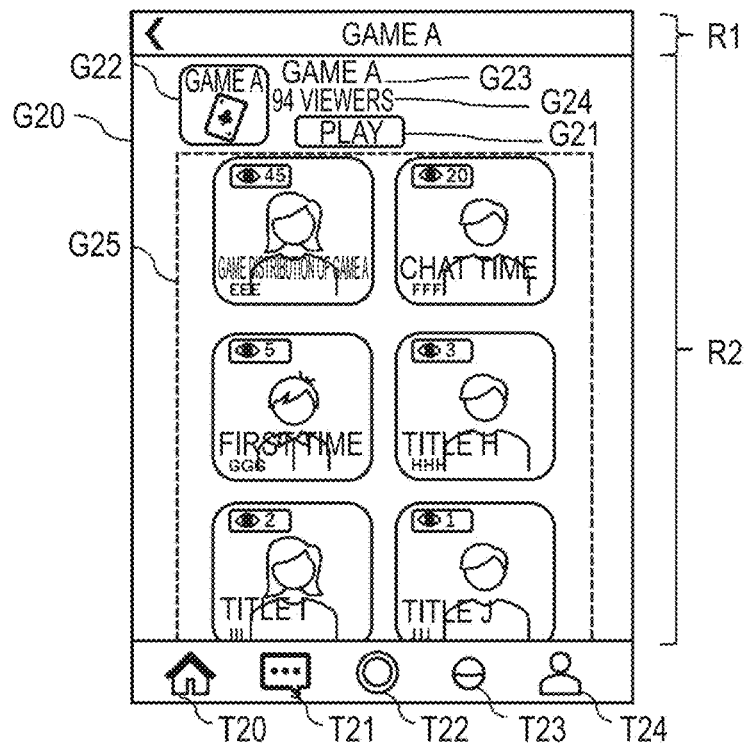
FIG. 10 is a conceptual diagram illustrating an exemplary image of the screen that is displayed on the user terminal.

Then, FIG. 10 corresponds to an exemplary embodiment of a game details screen in the first screen. The first screen that is the game details screen is a screen G20 that is transitioned by selecting the game icon G12 or the game name G13 displayed on the game list screen illustrated in FIG. 9.

Such a first screen may include the distribution preparation button T22 as the distribution start object, the play start button G21 as the play start object, and the thumbnail image indicating the distribution channel of the video.

In addition, on the first screen, a game icon G22, a game name G23, the total number G24 of viewers of the distribution channel of the game, and a distribution list G25 including the thumbnail image of the distribution channel during the game distribution may be respectively displayed.

Note that, here, a display order of the thumbnail image that is displayed in the distribution list G25 to be displayed can be changed by the viewing user. As an example, the thumbnail image may be arranged in priority order such as in descending order of the number of follows of the viewing users and the number of views of the viewing users, in descending order of the cumulative number of viewers, and in chronological order from the start of the distribution. Note that a display range of the thumbnail image of the distribution list G25 can be changed by vertical scroll.

The distribution list G25 may be updated in the case of returning from the screen of the other tab and when performing an update manipulation (pull-to-refresh).

As described above, the user who selects the distribution start object (the distribution preparation button T22) or the play start object (the play start buttons G11 and G24) may be the distribution user performing the distribution start request or the play start request.

In addition, the user who selects the thumbnail image may be the viewing user viewing the second video.

In addition, the first screen may include a first region in which a scroll manipulation is not available, and a second region in which the scroll manipulation is available.

Here, the first screen is the first screen illustrated in FIG. 10. Then, the first screen may include a first region R1 and a second region R2. Specifically, in the first region R1, the game title is displayed, and in the second region R2, the play start button G21, the game icon G22, the game name G23, the number G24 of viewers, and the distribution list G25 may be displayed.

Then, the first region R1 may be a portion in which the scroll manipulation is not available and is fixedly displayed on the display screen, and the second region R2 may be a portion in which the scroll manipulation is available by the user. By scrolling the second region R2, the user may be capable of checking the thumbnail image hidden outside the screen.

However, it may be desired to avoid having the play start button G21 be hidden outside the screen by scrolling the second region, and thus, the display processing circuit in the disclosure may be capable of displaying the play start object (the play start button G21) in the first region R1, in accordance with a display state of the play start object (the play start button G21) displayed in the second region R2.

Figure 11:
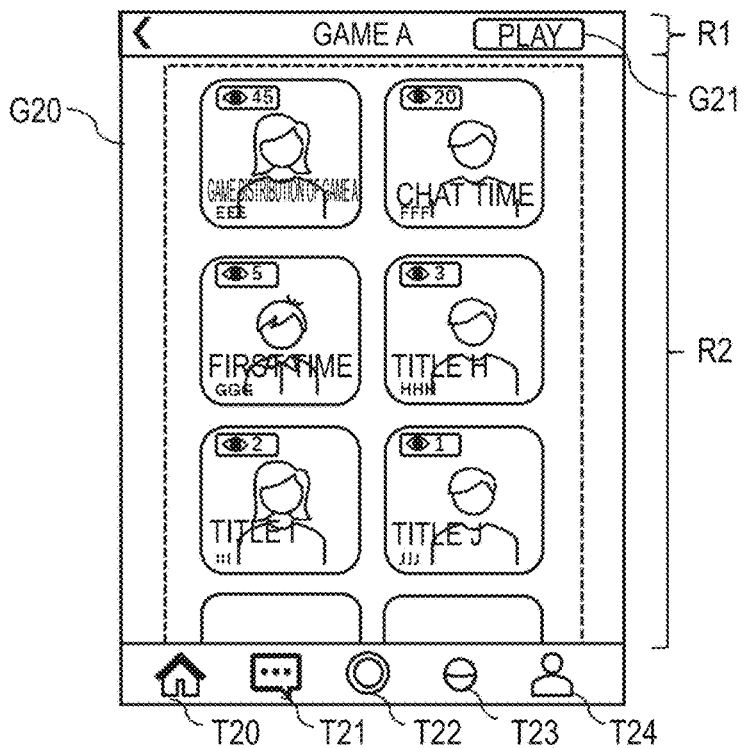
FIG. 11 is a conceptual diagram illustrating an exemplary image of the screen that is displayed on the user terminal.

As an example, in FIG. 10, the play start button G21 may be displayed in the second region R2, but in FIG. 11, the play start button may be displayed in the first region R1. That is, in a case where a part or all of the play start button G21 is not displayed in the second region R2, the play start button G21 may appear in the first region.

In addition, the game display processing circuit may gradually display the play start object in the first region R1, in accordance with the display state of the play start object displayed in the second region R2.

Such expression can be attained by changing the transparency of the play start object, in accordance with a scroll amount of the second region R2.

As an example, the scroll amount (unit is pixels) of 0 to 50 may correspond to a button transparency of 0.0 (completely transparent) to 1.0 (completely opaque). Then, in the initial display state, the object may be completely transparent, and thus, is not seen, and the object is completely displayed in the case of scrolling by 50 pixels or more. In an exemplary embodiment, the transparency of the object may be linearly changed in (0 to 50). Note that the unit of the scroll amount may be logic pixels, which may be different from the actual pixels of the display.

In addition, the game request reception circuit may be capable of receiving a play end request for the predetermined game from the distribution user terminal 100 after the information relevant to the second video is distributed by the game video distribution circuit. The play end request can be transmitted by the selection of the end button arranged on the game screen.

Then, in a case where the game request reception circuit receives the play end request for the predetermined game, the distribution start circuit may be capable of ending the distribution of the information relevant to the second video, and distributing the information relevant to the first video.

That is, here, not a part of the information of the first video but the entire information of the first video may be distributed.

Then, in a case where the distribution start circuit ends the distribution of the information relevant to the second video, and distributes the information relevant to the first video, the first video may be displayed on the viewing user terminal 200.

Subsequently, a flow of starting the viewing of the video may be described.

One or a plurality of processors in the disclosure may further include a viewing reception circuit.

The viewing reception circuit may receive a viewing request for the video from the user.

The distribution start circuit may distribute information relevant to a set of visual elements and a voice as video information to the information processing terminal of the user, in accordance with the viewing request.

Figure 12:
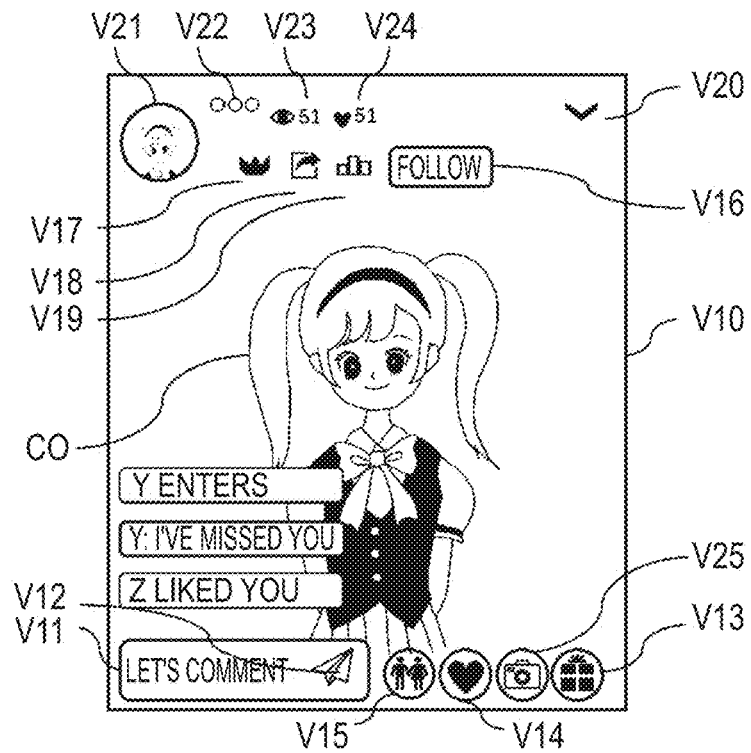
FIG. 12 is a conceptual diagram illustrating an exemplary image of the screen that is displayed on the user terminal.

FIG. 12 is an example of a viewing screen V10 of an avatar video that may be displayed on the viewing user terminal 200.

The viewing user may input a text to a comment posting column V11, and may press a transmission button V12, and thus, may be capable of posting a comment.

In addition, by pressing a gift button V13, a gift list (a screen V30 in FIG. 13) can be displayed to the viewing user, and a display request for a gift designated by selection can be transmitted.

In this case, one or a plurality of processors in the disclosure may include a determination circuit. The determination circuit determines whether there is the display request for the gift from the viewing user terminal 200.

In the display request, the gift object information can be included. The gift object information may include at least the gift object identification information for specifying the type of gift object, and the position information indicating the position in which the gift object may be displayed.

Figure 13:
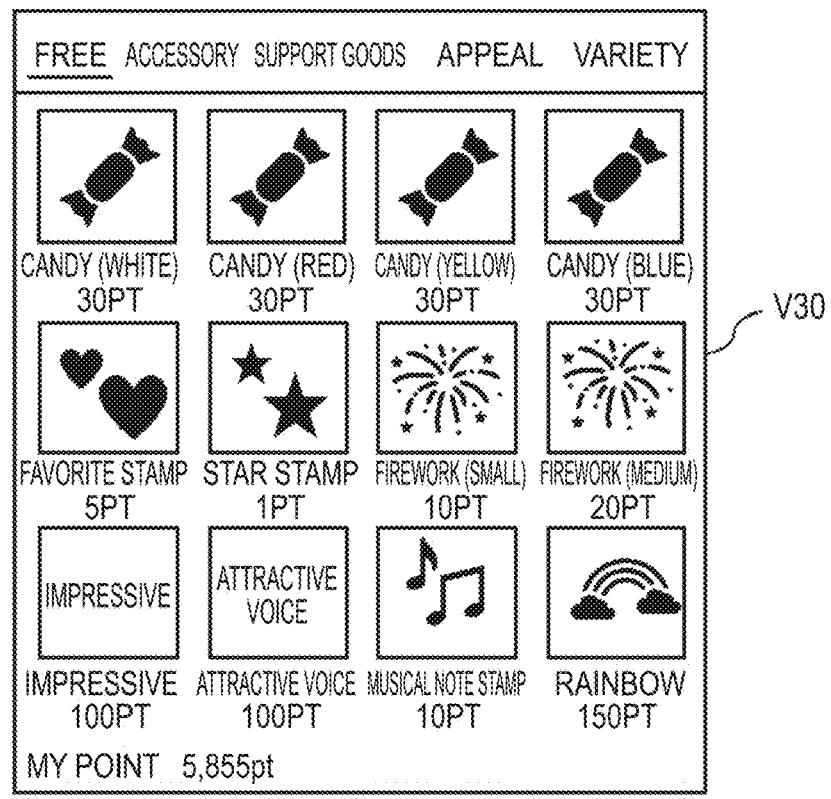
FIG. 13 is a conceptual diagram illustrating an exemplary image of the screen that is displayed on the user terminal.

In addition, as illustrated in FIG. 13, the gift can be displayed separately for each classification (such as a free (paid) gift, an accessory, support goods, appeal, and variety).

Here, the paid gift is a gift that can be purchased by consuming coins purchased by the viewing user, and the free gift may be a gift that is available with or without consuming points that may be acquired by the viewing user without any charge.

Note that, the term "gift" in the present application may indicate the same concept as that of a "token". Therefore, the term "gift" can also be replaced with the term "token" to understand the technology described in the application.

In addition, by pressing a like button V14, the viewing user may be capable of posting evaluation indicating favoredness. Note that buttons for posting negative evaluation or other feelings can also be displayed in addition to/instead of the like button V14.

In addition, in a case where the distribution user may set the appearance of the other user to be available in the distribution setting, the appearance in the video can be asked by selecting a collaboration ask button V15.

In addition, a follow button V16 for the viewing user to follow the distribution user is displayed on the screen of the video distributed by the distribution user who is not yet followed by the viewing user. The follow button may function as a follow cancel button on the screen of the video distributed by the distribution user who is already followed by the viewing user.

Note that, the viewing user may "follow" the viewing user, the distribution user may "follow" the viewing user, and the distribution user may "follow" the distribution user.

Here, the follow is managed as association only in one direction, and association in a reverse direction is separately managed as a follower.

In addition, a photo button V25 for storing the still image of the screen can also be displayed.

In addition, on the viewing screen V10, a support ranking display button V17, a share button V18, and a ranking display button V19 may be also displayed.

The support ranking may display the ranking of the viewing users supporting the distribution user, and the ranking can be calculated in accordance with the value (for example, in points or in coins) of the gift, or the like.

In addition, regarding the sharing of the video, by pressing the share button V18, the viewing user may be capable of checking a sharable social network service (SNS) list and transmitting a fixed link to a designated location of the SNS designated by selection.

In addition, by pressing the collaboration ask button V15, it is possible to request collaboration distribution to the distribution user. The collaboration distribution may indicate that the character object of the viewing user may appear in the distribution video of the distribution user.

In the upper portion of the viewing screen V10, a distribution user icon V21, a distribution user name (a character object name) V22, cumulative number of viewers display V23, and cumulative number of likes display V24 can be displayed.

In addition, in a case where the viewing end button V20 is selected, a screen for ending the viewing may be laid out, and a viewing end request can be transmitted.

Such a screen for ending the viewing may be described in detail. Such a screen is referred to as "small-window voice distribution", and may be for performing viewing in a state where only the voice is played back without the display of the visual elements of the video.

The selection of the viewing end button V20 may be received by the viewing reception circuit as the viewing end request for the video.

In this case, the distribution start circuit may end the distribution of the information relevant to the visual elements of the video, in accordance with the viewing end request, but may not end the distribution of the information relevant to the voice.

Then, in the user terminal, in a case where the information relevant to the visual elements of the video and the voice is distributed, the visual elements of the video may be displayed on a main screen of the user terminal, and in a case where only the information relevant to the voice is distributed, the visual elements of the video may not be displayed but a sub-screen indicating that the video is being viewed may be displayed on the user terminal.

Figure 14:
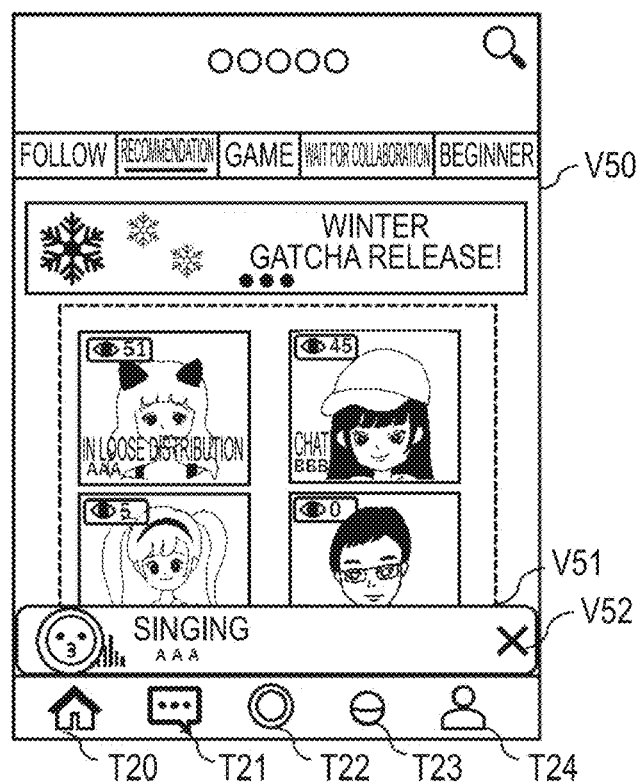
FIG. 14 is a conceptual diagram illustrating an exemplary image of the screen that is displayed on the user terminal.

FIG. 14 illustrates an image of a screen V50 on which a sub-screen V51 described above may be displayed.

When such a sub-screen V51 is displayed, the main screen displayed at the back may be transitioned to the screen before viewing the video. For example, in the case of moving from the recommendation tab to the viewing frame, the main screen returns to the display of the recommendation tab, and in the case of moving from the follow tab to the viewing frame, the main screen may be transitioned to the follow tab.

In a case where the sub-screen V51 is displayed, an input on the main screen is available, and transition to other screens may be available.

On the sub-screen V51, a profile image, a name, a title, and a voice icon in which the flow of the voice is visually identifiable may be displayed.

Then, the viewing can be completely ended by the selection of an end icon V52 displayed on the sub-screen V51.

Note that the end of the display of the visual elements of the video may be that the information is transmitted from the server apparatus, but is not displayed on the terminal side, or may be that the transmission itself of the information is stopped from the server apparatus.

According to such a configuration, it is possible to search for other distributions or enjoy chatting with other users while listening only to the voice.

Subsequently, the "collaboration" in which the other user may appear in the video of the distribution user may be described.

As described above, the viewing user may be capable of transmitting a participation request for the video described above through a check screen of a collaboration distribution participation request that is displayed by pressing the collaboration ask button V15 illustrated in FIG. 12.

A collaboration avatar display circuit provided in one or a plurality of computer processors in the disclosure may display the character object generated based on the motion of the viewing user who has made the participation request in the video, in accordance with the received participation request.

Figure 15:
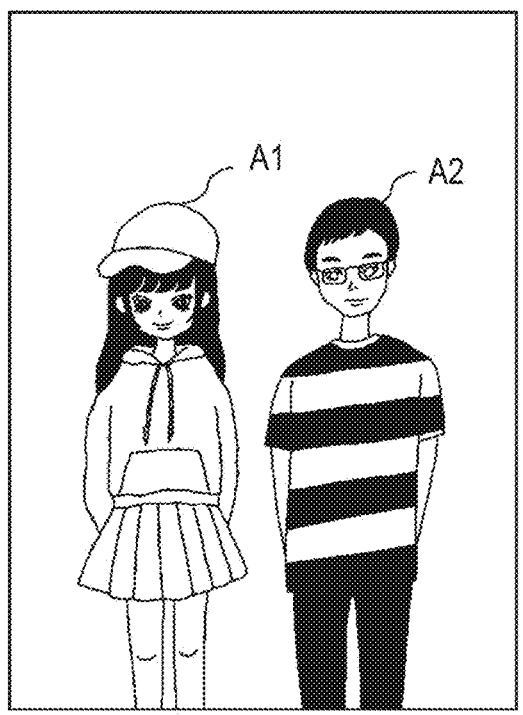
FIG. 15 is a conceptual diagram illustrating an exemplary image of the screen that is displayed on the user terminal.

As an example, FIG. 15 illustrates a viewing screen or a distribution screen in a case where a second avatar A2 that is a character object of a guest user participates in a video in which a first avatar A1 that is a character object of a host user is displayed. Note that, in FIG. 15, the display of objects other than the avatars is omitted.

Figure 16:
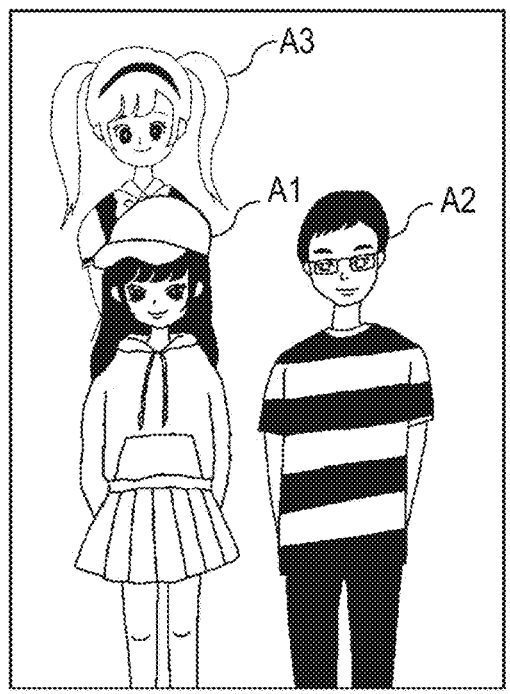
FIG. 16 is a conceptual diagram illustrating an exemplary image of the screen that is displayed on the user terminal.

In addition, as illustrated in FIG. 16, a third avatar A3 that is a character object generated based on the motion of another viewing user may further participate in the video. Note that, in FIG. 16, the third avatar A3 may be arranged behind the first avatar A1 and the second avatar A2, but three people may be arranged side by side. In addition, an arrangement position of the avatar can be designated by the distribution user.

Figure 17:
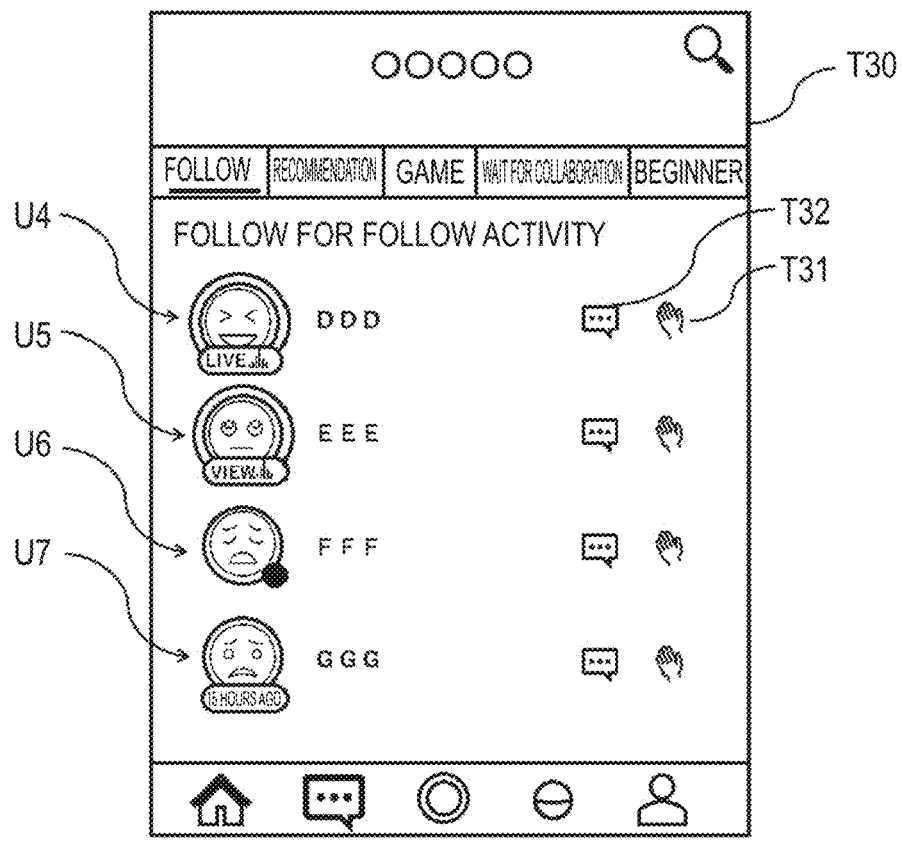
FIG. 17 is a conceptual diagram illustrating an exemplary image of the screen that is displayed on the user terminal.

FIG. 17 illustrates a list screen T30 of the users having a mutual follower relationship, which is displayed by the selection of the follow tab on the top screen illustrated in FIG. 5. The mutual follower status may indicate a relationship in which the users may be followers of each other.

On the list screen T30, profile images and names of the users having the mutual follower relationship may be displayed.

As illustrated in FIG. 17, on the list screen T30, the first object T31 may be displayed for each of the users having the mutual follower relationship. In addition, a chat object T32 may be displayed together with the first object T31. By selecting such a chat object, it is possible to transition to an individual chat screen with a second user.

The first object T31 may transmit a predetermined notification to the terminal of the user associated with the first object T31.

As an example, the predetermined notification can be a calling notification.

First Embodiment

Subsequently, various functions executable in the distribution user terminal 100, the viewing user terminal 200, and/or the server apparatus 400, which may be provided in the information processing system 3000 according to a first embodiment in the disclosure, may be described with reference to the drawings.

Figure 18:
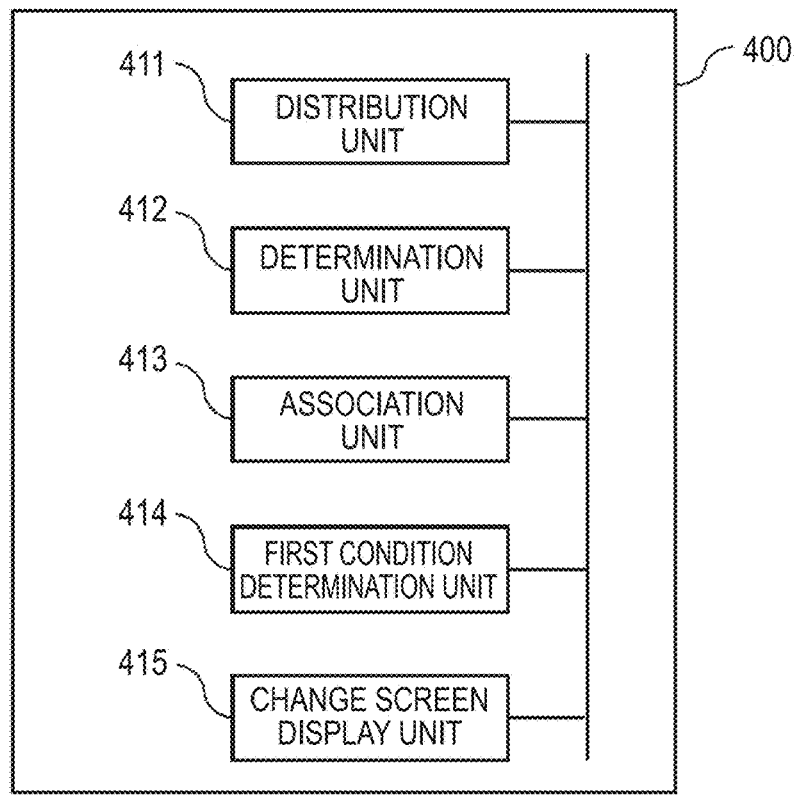
FIG. 18 is a configuration diagram illustrating an example of a function configuration of a server apparatus in a first embodiment in the disclosure.

As illustrated in FIG. 18, one or a plurality of computer processors provided in the information processing system 3000 according to the embodiments of the disclosure include a distribution circuit 411, a determination circuit 412, an association circuit 413, a first condition determination circuit 414, and a change screen display circuit 415. The distribution circuit 411 may transmit the information relevant to the video including the character object of the distribution user to the viewing user terminal 200 to display the video on the viewing user terminal 200.

Such a distribution circuit 411 may function as the distribution start circuit described above. The details may be as described above.

The determination circuit 412 may determine a predetermined part from a plurality of parts wearable by the character object in accordance with a predetermined method, based on the input of the distribution user.

As an example, the predetermined method can be a drawing method. In one or a plurality of computer processors provided in the information processing system 3000 in the disclosure, the distribution user may select the gatcha button T23 on the top screen T10 (FIG. 5), the gatcha button D12 displayed on the avatar setting screen D10 (FIG. 6) or the avatar distribution screen D30 (FIG. 8), and thus, a drawing screen for acquiring the part of the avatar is laid out. In addition, the drawing screen may be laid out by selecting the display column T13 in which a notice relevant to gatcha on the top screen T10 is displayed.

Specifically, in a case where the gatcha button or the like is selected by the distribution user, a plurality of gatcha themes respectively including the plurality of parts separated for each theme may be displayed on the screen. Then, the determination circuit 412 may determine one predetermined part drawn from the plurality of parts included in the gatcha theme selected by the distribution user, based on a predetermined probability set in advance.

Note that the drawing can be performed by consuming the coin purchased by the user or gatcha tickets given by a login bonus or the like.

The association circuit 413 associates the predetermined part determined by the determination circuit 412 with user information of the distribution user.

A user ID, a user name (an avatar name), a birthday, information relevant to own coins/points/gatcha tickets (an electronic medium), information relevant to ranking, information relevant to linkage with the external SNS, and information relevant to avatar data, and the like may be associated with the user information of the user. The information relevant to the avatar data may include information relevant to the part configuring the avatar (such as a part ID).

As an example, the predetermined part associated with the user information of the distribution user may be selected from the closet screen. In addition, the predetermined part determined by the determination circuit 412 can also be directly applied to the user character without using the closet screen.

Note that the closet screen may be a screen that is laid out by selecting the clothing change button D13 displayed on the avatar setting screen D10 illustrated in FIG. 6, or the like.

The first condition determination circuit 414 may determine whether a first specific condition relevant to the distribution user is satisfied.

The satisfaction of the first specific condition may be achieved in a case where a specific electronic medium is associated with the user information.

As an example, the specific electronic medium may be an electronic medium that can be purchased by the distribution user, and expiration date information and/or use frequency information may be associated with the specific electronic medium. Note that, an expiration date can be automatically updated unless there is a cancel instruction from the user. That is, such a specific electronic medium may be used in a subscription service. Examples of the type of subscription service include a frequency limitation type, a period limitation type, or the like.

In the disclosure, the specific electronic medium may be referred to as a "pass" or a "oo pass" to be distinguished from the coin, the point, the ticket, and the like described above.

In a case where the first condition determination circuit 414 may determine that the first specific condition is satisfied, the change screen display circuit 415 may display the change screen described above on the distribution user terminal 100 of the distribution user.

Figure 19:
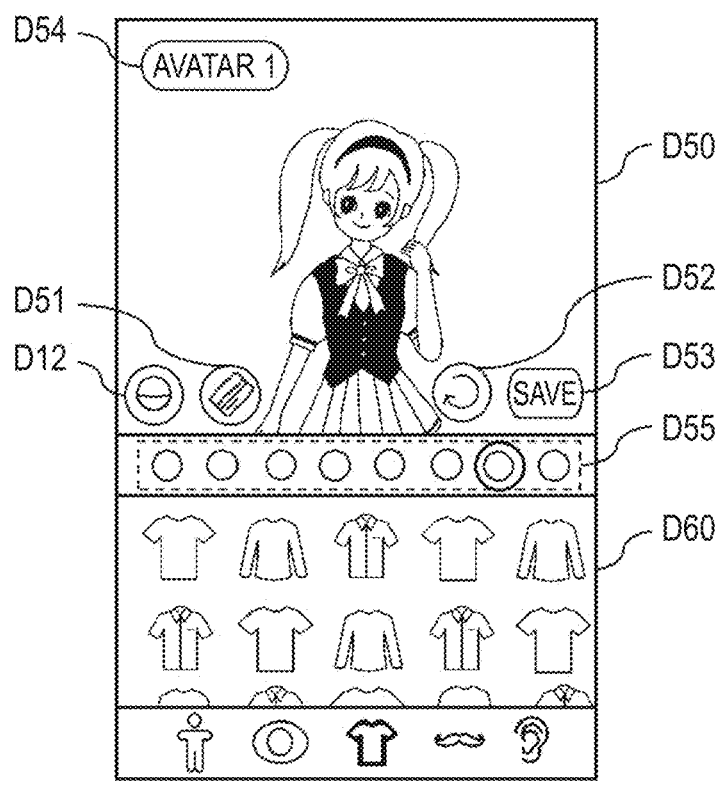
FIG. 19 is a conceptual diagram illustrating an exemplary image of a screen that is displayed on a user terminal.
Figure 20:
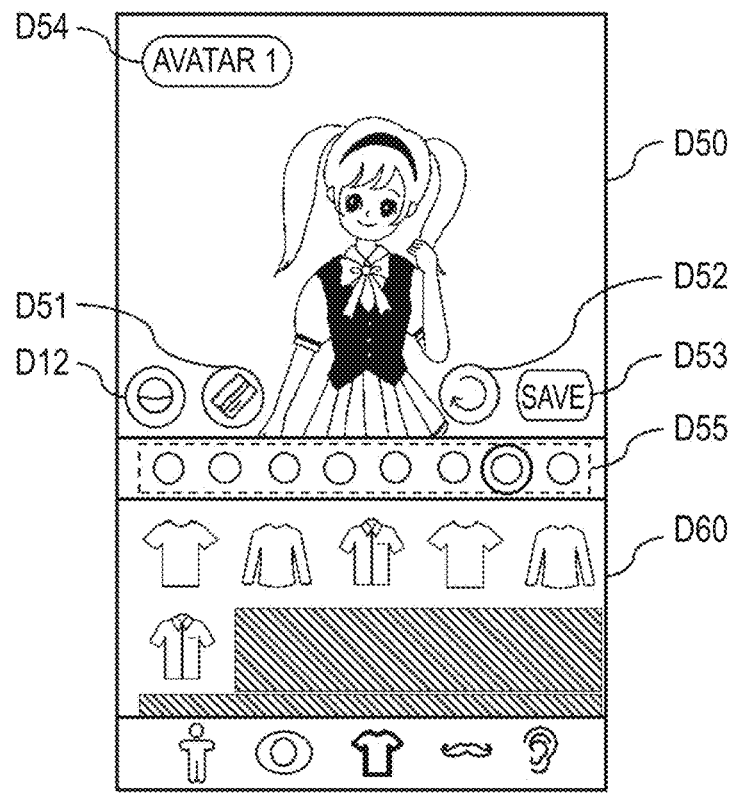
FIG. 20 is a conceptual diagram illustrating an exemplary image of the screen that is displayed on the user terminal.

The change screen may be a screen for changing the predetermined part determined by the determination circuit 412 or the predetermined part associated by the association circuit 413 to another part in which a part of the predetermined part is changed. FIGS. 19 and 20 illustrate an exemplary image of a change screen D60 in a case where the predetermined part may be changed to another part on a closet screen D50 laid out from the avatar setting screen D10, after the association circuit 413 associates the predetermined part with the user information.

As an example, as illustrated in FIG. 19, an icon D51, the gatcha button D12, an undo button D52, a save button D53, and a slot switch button D54, as specific display described below, may be displayed on the closet screen D50. Here, the icon D51 may be referred to as a pass icon D51. In a case where the pass icon D51 is selected by the user, the change screen D60 for changing a part of the predetermined part (the part associated with the user information by the association circuit 413, that is, an item acquired by the gatcha) may be laid out.

The gatcha button D12 may be a button for laying out a gatcha screen.

The undo button D52 may be a button for removing a part newly applied to the avatar to return to the original part. Here, a change before the save button D53 is pressed after the closet screen D50 is laid out can be canceled by the undo button D52.

The save button D53 may be a button for fixing the part applied to the avatar. When the save button D53 is selected, the part applied to the avatar may be stored in association with the user information as the avatar data.

The slot switch button D54 may be a button for switching a slot with which the avatar is associated. The user may be capable of preparing a plurality of avatars, and each of the avatars may be associated with the slot. The user may be capable of changing the part of the avatar in each slot.

Note that parts other than the predetermined part (for example, free parts prepared in advance, and the like) may also be displayed on the closet screen D50, and thus, when the pass icon D51 is selected by the user, the parts other than the predetermined part may be displayed in a grayout manner (FIG. 20).

Then, in a case where one predetermined part is selected by the user, and a button for changing a part of the part (in FIGS. 19 and 20, a color button displayed in a color display frame D55, with which a different color is associated) is selected, the predetermined part may be changed to another part with a different color, and may be applied to the avatar displayed on the screen.

Note that, the color button displayed in the color display frame D55 may be changed in accordance with the selected one predetermined part. For example, a database can be stored in which information relevant to changeable colors is associated with information of the predetermined part, and the type (the color) of color button displayed in the color display frame D55 can be determined based on such a data table.

In addition, the type of color button displayed in the color display frame D55 may be determined based on information relevant to parts that may be owned by the user or configure the avatar data. For example, one or a plurality of suitable colors may be determined based on the color of the same part or other parts stored in the closet of the user, and may be displayed or preferentially displayed. In addition, one or a plurality of suitable colors may be determined based on the color of the other parts configuring the avatar data of the user, and may be displayed or preferentially displayed. Here, preferential display is a center position, a left end position, or the like in the color display frame D55.

Note that the determination of the color described above may be performed by collating the part owned by the user with a predetermined database. The same color as one color or the corresponding color may be associated with the predetermined database. Note that the corresponding color may be a color in which at least one of hue, brightness, and saturation is the same as or close to that of one color (within a predetermined range). In addition, in a case where there may be a plurality of parts owned by the user, the determination described above may be performed based on the largest part.

Alternatively, the type of color button displayed in the color display frame D55 may be determined based on information relevant to a color selected by the user in the past. For example, one or a plurality of suitable colors may be determined based on a color that has been recently selected, and may be displayed or preferentially displayed.

Note that, here, the color has been described as a change target, but the change target is not limited insofar as the change target is a part of the part. For example, the texture of the part may be changed.

Such a texture may be changed to another part by being subjected to UV scroll, by changing the texture itself, or the like. The details may be described below.

In addition, in such a configuration, the color display frame D55 may function as a texture display frame. Specifically, a changeable texture or a changeable motion of the texture may be displayed in the texture display frame, and as with the color display frame, the texture or the motion of the texture to be displayed in the texture display frame may be changed in accordance with the selected one predetermined part.

Figure 21:
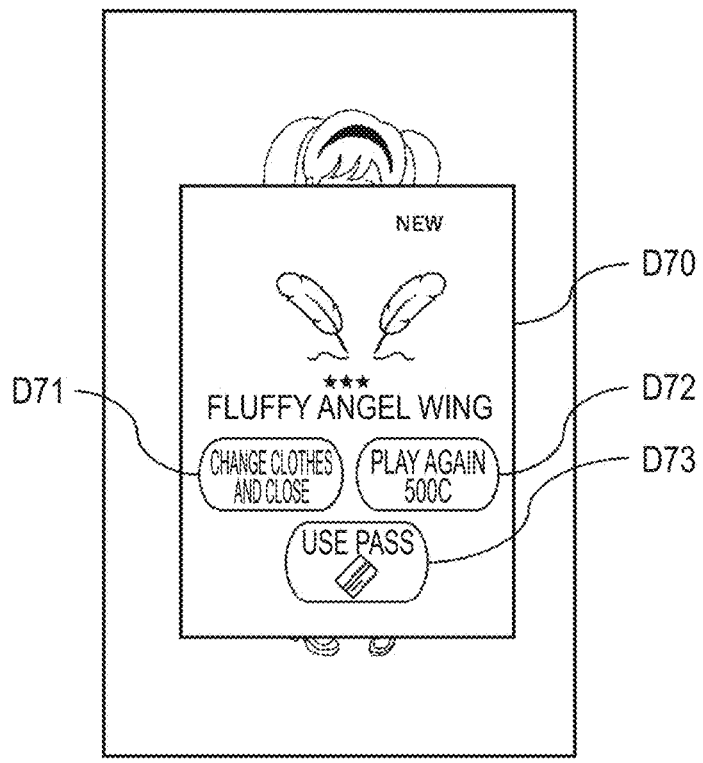
FIG. 21 is a conceptual diagram illustrating an exemplary image of the screen that is displayed on the user terminal.

FIG. 21 illustrates an exemplary image of a check screen D70 displayed after the gatcha. On the check screen D70, a button D71 for directly applying the part determined by the gatcha to the avatar, a button D72 for playing the gatcha again, and a pass icon D73 for using a pass can be displayed together with an image of a part determined by the gatcha (here, a fluffy angel wing part that is a wearable part with rarity of three stars).

In a case where the pass icon D73 is selected by the user, the change screen D60 as described above may be laid out. That is, in this case, the specific display is the check screen D70, and the selection of the check screen D70 is that the pass icon D73 for using the pass may be selected.

Then, the association circuit 413 may associate another part changed based on the input of the distribution user with respect to the change screen D60 with the user information, and may cancel the association of the predetermined part with the user information.

Figure 22:
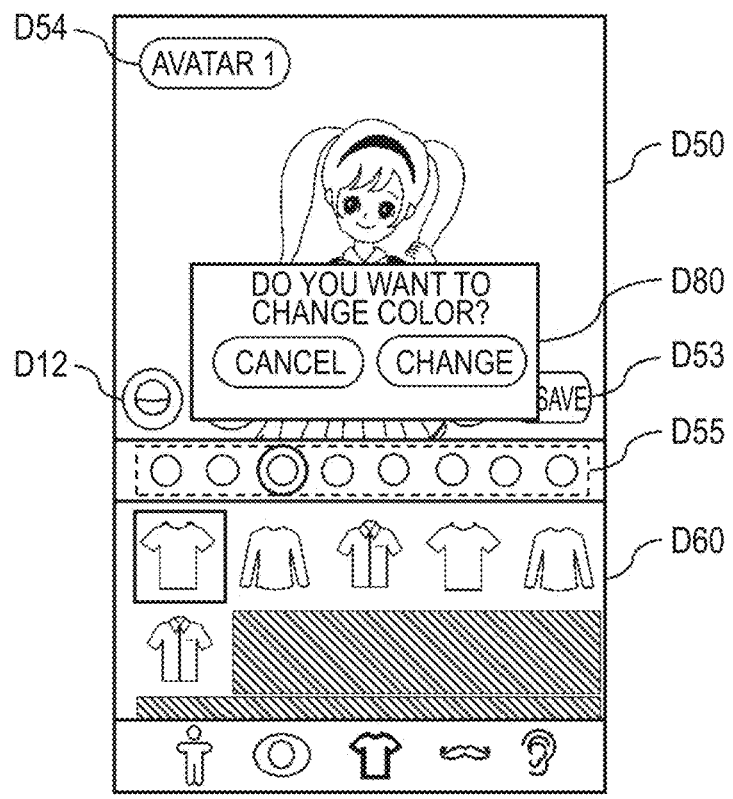
FIG. 22 is a conceptual diagram illustrating an exemplary image of the screen that is displayed on the user terminal.

Specifically, in a case where the save button D53 on the change screen D60 illustrated in FIGS. 19 and 20 is selected by the user, another part may be stored in association with the user information, and the avatar to which another part is applied may be stored in association with the user. Then, the association of the previous part is canceled. Note that, in this case, a final check screen D80 for performing final check of the change as illustrated in FIG. 22 may be displayed.

According to the configuration described above, it is possible to provide technical improvement for solving or lessening at least a part of the problems of the related art described above. Specifically, according to the configuration described above, it is possible to extend acquisition means for parts.

For example, the user may be capable of increasing the opportunity to acquire a desired part by purchasing the pass. Specifically, in a case where a desired part with a different color is acquired by the gatcha, the part with a different color can be changed to a part with a desired color by using the pass. This is more efficient than a case where the user continuously plays the gatcha to acquire the desired part, which is advantageous for the user.

In addition, by preparing a plurality of parts in which a part of the part is changed with respect to one part, it is possible to reduce a production cost compared to a case where a plurality of parts may be newly produced from the beginning.

In addition, according to the configuration in which the color can be selected after selecting the part on the change screen, it is possible to display a plurality of other parts with space-saving, in a terminal having a small display region, such as a smart phone.

In addition, according to the configuration in which another part is displayed to be selectable on the change screen, it is possible to reduce the number of times for selection of the user, which improves the convenience of the user.

As described above, the expiration date information and/or the use frequency information may be associated with the specific electronic medium, and the association of the specific electronic medium with the user information may include that the electronic medium is within an expiration date and/or does not reach an upper limit of a use frequency.

In addition, the satisfaction of the first specific condition can be that the specific electronic medium is associated with the user information, and the specific display for displaying the change screen is selected based on the input of the distribution user.

As described above, the specific display can be the check screen D70 that may be displayed before the association circuit 413 associates the predetermined part with the user information after the determination circuit 412 determines the predetermined part, or the icon D51 that may be displayed on the closet screen laid out from the avatar setting screen D10 or the like after the association circuit 413 associates the predetermined part with the user information.

Note that the specific display may be displayed only in a case where the specific electronic medium is associated with the user information. In this case, satisfaction of the first specific condition may occur when the specific display is selected based on the input of the distribution user.

As described above, the specific display can be the check screen D70 of whether to display the change screen D60.

In this case, the specific display is in the first specific condition for the change screen display circuit 415 to display the change screen for changing the predetermined part determined by the determination circuit 412 to another part in which a part of the predetermined part is changed.

As described above, the specific display can be the icon D51 for displaying the change screen D60.

In this case, the specific display may be in the first specific condition for the change screen display circuit 415 to display the change screen for changing the predetermined part associated by the association circuit 413 to another part in which a part of the predetermined part is changed.

The predetermined part associated with the user information by the association circuit 413 can be displayed to be selectable on the closet screen D50 that can be displayed in the video.

In this case, in a case where the predetermined part is selected on the closet screen D50, the icon D51 can be displayed, or the icon D51 displayed in advance can be highlighted.

In FIGS. 19 and 20, an example is illustrated in which the icon D51 may be displayed in advance on the closet screen, but the icon D51 may be displayed in a case where the predetermined part is selected. Alternatively, the icon displayed in advance may be highlighted.

In addition, as illustrated in FIG. 20, in a case where the icon D51 is selected on the closet screen D50, parts other than the predetermined part associated with the user information by the association circuit 413 can be unselectable.

In addition, as another aspect, another part in which a part of the predetermined part is changed may be displayed to be selectable on the change screen D60.

According to such a configuration, since the number of times for selection by the user is reduced, a change operation is further facilitated.

In addition, attribute information can be further associated with the specific electronic medium.

In this case, another part in which a part of the predetermined part is changed may be displayed to be selectable on the change screen D60, based on the attribute information.

As an example, the attribute information is a theme. The user may be capable of selecting and purchasing the theme when purchasing the electronic medium. In the case of a color pass, the theme may be a color taste such as pastel, pink, and black. Then, on the change screen D60, only a changeable option may be presented in accordance with the theme.

For example, in the case of having a color pass associated with attribute information of a pink taste, only one part changed to a predetermined pink color, or only a plurality of parts changed to various pink colors may be displayed to be selectable.

Note that, in this configuration, it has been described that another part is displayed to be selectable, but as described above, the color can be selected after selecting the part. As described above, another part can be a part with a color different from that of the predetermined part.

In this case, the specific electronic medium may function as a color pass for color change.

As described above, another part can be a part in which the texture of the predetermined part is subjected to UV scroll.

UV scroll is a method for performing addition or subtraction with respect to a UV coordinate set in the texture to create the visual impression that an image is being scrolled, and as an example, it may be possible to perform display as if a star is twinkling or a letter is flowing.

In this case, the electronic medium may function as a UV scroll pass for UV scroll.

In addition, another part can be a part in which the texture of the predetermined part is changed.

In this case, the electronic medium may function as a texture pass for texture change.

In addition, the electronic medium may function as a rarity pass for increasing the rarity of the predetermined part. In this case, the UV scroll described above may be applied to the predetermined part, in accordance with an increase in the rarity.

Figure 23:
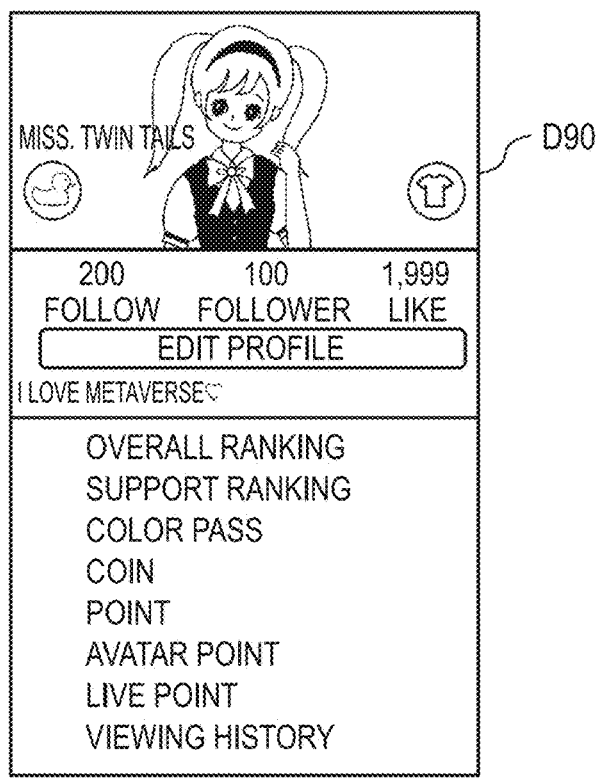
FIG. 23 is a conceptual diagram illustrating an exemplary image of the screen that is displayed on the user terminal.

A method for purchasing the specific electronic medium may be the same as a method for purchasing the coin, and the pass can be checked, purchased, updated, canceled, and the like from a profile screen D90 as illustrated in FIG. 23.

In addition, in a case where a character object of another user is included in the video (in the case of the collaboration distribution described above), the determination circuit 412 may determine a predetermined part from a plurality of parts wearable by the character object of the distribution user and/or the character object of another user in accordance with a predetermined method, based on the input of the distribution user or another user.

The association circuit 413 may associate the predetermined part determined by the determination circuit 412 with the user information of the distribution user and/or user information of another user.

Another part changed based on the input of the distribution user or another user with respect to the change screen can be associated with the user information of the distribution user and/or the user information of another user, and the association of the predetermined part with the user information of the distribution user and/or the user information of another user can be canceled.

As described above, in the collaboration distribution, both the host user and the guest user may be capable of playing the gatcha, and in this case, parts to be provided may be a part wearable by the host user and/or the guest user.

Then, in a case where the host user has the pass, the host user and/or the guest user may be capable of changing a part of the part. In addition, even in a case where the guest user owns the pass, the host user and/or the guest user may be capable of changing a part of the part.

According to the configuration described above, in a case where one user already has the same part as the part to be provided by the gatcha, it is possible to meet the need that the other user desires to purchase, prepare, and wear the same part.

As described above, the color of the avatar item (part), and the like can be changed in accordance with the preference of the user, and thus, it is possible to extend means for acquiring a desired avatar item of the user.

In the gatcha of the avatar item of the related art, a plurality of colors may be prepared for the avatar item, and the color may be determined by a probability.

Accordingly, even in a case where the avatar item itself is desirable for the user, the color may not match with other avatar items owned by the user, or may not be the theme color of the avatar.

In the case of purchasing the color pass of the subscription service as described above, the "avatar item acquired by the gatcha can be exchanged with the same item with another color" (may be limited to X times a month).

Second Embodiment

Subsequently, various functions executable in the distribution user terminal 100, the viewing user terminal 200, and/or the server apparatus 400, which may be provided in the information processing system 3000 according to a second embodiment in the disclosure, may be described with reference to the drawings.

In this technical field, how to improve a distribution motivation of the distribution user, a viewing motivation of the viewing user, and/or an interaction motivation between the users is an important task.

Accordingly, an object of the disclosure is to provide a technical improvement for solving or lessening at least a part of the problems of the related art described above. One of the more specific objects in the second embodiment of the disclosure is to provide an information processing system, an information processing method, and a computer program that may be capable of improving the distribution motivation of the distribution user, the viewing motivation of the viewing user, and/or the interaction motivation between the users.

Figure 24:
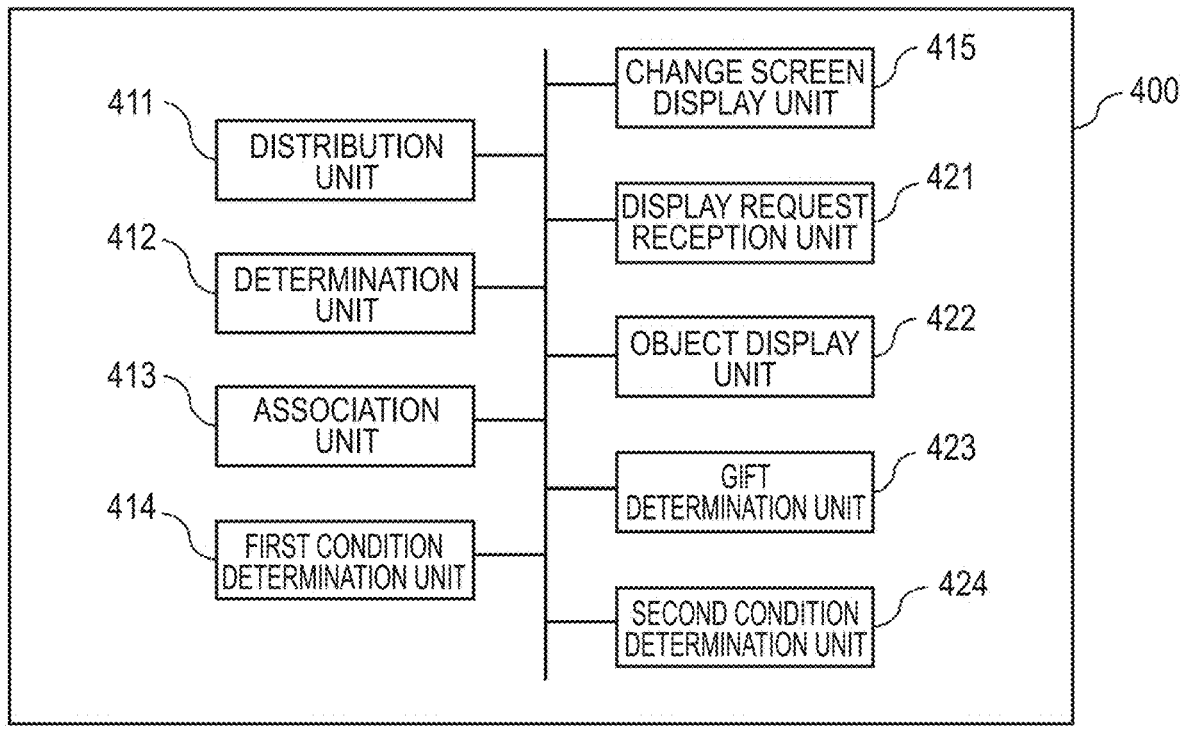
FIG. 24 is a configuration diagram illustrating another example of the function configuration of the server apparatus in the first embodiment in the disclosure.

As illustrated in FIG. 24, one or a plurality of computer processors provided in the information processing system 3000 according to the second embodiment of the disclosure include the distribution circuit 411, a display request reception circuit 421, an object display circuit 422, a gift determination circuit 423, and a second condition determination circuit 424.

The distribution circuit 411 may transmit the information relevant to the video including the character object of the distribution user to the viewing user terminal 200 to display the video on the viewing user terminal 200.

The display request reception circuit 421 may receive the display request for the gift that is transmitted from the viewing user terminal 200.

The object display circuit 422 may display a gift object corresponding to the gift in the video, in accordance with the display request received by the display request reception circuit 421.

The gift determination circuit 423 may determine whether the gift according to the display request received by the display request reception circuit 421 is a specific gift.

Here, the specific gift is a gift associated with a specific electronic medium according to a second specific condition described below.

In a case where the gift determination circuit 423 may determine that the gift is the specific gift, the second condition determination circuit 424 may determine whether the second specific condition relevant to the distribution user and/or the viewing user is satisfied.

The satisfaction of the second specific condition can be that the specific electronic medium is associated with the user information of the distribution user and/or the viewing user.

As an example, the specific electronic medium may be an electronic medium that can be purchased by the distribution user and/or the viewing user, and expiration date information and/or use frequency information may be associated with the specific electronic medium. Note that an expiration date can be automatically updated unless there is a cancel instruction from the user. That is, such a specific electronic medium may be used in a subscription service.

Then, in a case where the second condition determination circuit 424 determines that the second specific condition is satisfied, the display request reception circuit 421 may receive the display request without reducing a point associated with the viewing user.

In this case, the specific electronic medium may function as a "gift pass".

Specifically, in a case where the specific electronic medium is associated with the user information of the distribution user (that is, in a case where the distribution user acquires the gift pass), all the viewing users viewing the video of the distribution user may be capable of making the display request for the gift with respect to the video of the distribution user without any limitation and without any charge. This may indicate that the gift pass functions as a pass for the distribution user to unlimitedly receive a gift.

On the other hand, in a case where the specific electronic medium is associated with the user information of the viewing user (that is, in a case where the viewing user acquires the gift pass), the specific electronic medium may be capable of making the display request for the gift with respect to all the videos of the distribution user viewed by the viewing user without any limitation and without any charge. This may indicate that the gift pass functions as a pass for the viewing user to unlimitedly send a gift.

Note that the gift pass may be subjected to a limitation based on distribution frame (from the start to the end of the distribution start of one video) information, in addition to or instead of the limitation based on the expiration date information and/or the use frequency information. For example, unlimited sending/unlimited receiving may be attained only for one distribution frame.

In addition, the gift pass may be subjected to a limitation based on target time information, in addition to or instead of the limitation according to the expiration date information and/or the use frequency information. For example, the unlimited sending/unlimited receiving may be attained only from 21 o'clock to 22 o'clock.

In addition, the gift pass may be subjected to a limitation based on target user information, in addition to or instead of the limitation according to the expiration date information and/or the use frequency information. For example, unlimited receiving may be allowed only from one viewing user or unlimited sending may be allowed only to a video for one distribution user.

In addition, the gift pass may be subjected to a limitation based on price information of the gift, in addition to or instead of the limitation according to the expiration date information and/or the use frequency information. For example, unlimited sending/unlimited receiving may be permitted only for a gift with the number of required coins of 100 to 200 C.

In addition, the gift pass may be subjected to a limitation based on a display size of the gift and/or the type of gift, in addition to or instead of the limitation according to the expiration date information and/or the use frequency information. For example, unlimited sending/unlimited receiving may be provided only for a gift with a display size of less than a predetermined value. In addition, unlimited sending/unlimited receiving may be provided only for a gift associated with an event. Accordingly, it is possible to solve the problem that the screen is filled with the gifts and the character object is not seen.

In addition, in the use frequency information, use frequency information according to the price range of the gift may be included. For example, it may be possible to perform 10 instances of unlimited sending/unlimited receiving for a gift of 100 to 200 C, 5 instances of unlimited sending/unlimited receiving for a gift of 200 to 300 C, and only one instance of unlimited sending/unlimited receiving for a gift of 400 C or more may be permitted without any charge.

In any case, the gift object can be displayed in different modes, in accordance with the presence or absence of the gift pass. For example, the gift object that is displayed in a case where there is the gift pass can be displayed with a twinkling display effect.

In addition, in a case where both of the distribution user and the viewing user purchase the gift pass, the gift object may be displayed with a special effect. Examples of the special effect include increasing the size, adding a twinkle display effect, applying UV scroll, and the like, but the special effect is not limited thereto, and the gift object may be displayed in a spectacular mode, compared to a case where there is no gift pass or a case where only one user purchases the gift pass.

Note that, in the example described above, the gift determination circuit 423 may determine whether the gift according to the display request received by the display request reception circuit 421 is the specific gift, and may limit a gift to be subjected to unlimited sending/unlimited receiving, but all the gifts may be the specific gift to be subjected to unlimited sending/unlimited receiving. In this case, the determination step described above is not essential.

According to the configuration described above, it is possible to provide the technical improvement for solving or lessening at least a part of the problems of the related art described above. In addition, according to the disclosure, it is possible to provide the information processing system, the information processing method, and the computer program that may be capable of improving the distribution motivation of the distribution user, the viewing motivation of the viewing user, and/or the interaction motivation between the users.

In particular, in a case where unlimited receiving is distributed (in a case where the distribution user acquires the gift pass), there is an advantage that the video may be filled with the gifts in a manner that provides direct encouraging feedback to the distribution user, and there is an advantage that the viewing user is capable of sending a gift that is usually a paid gift without any charge. In addition, the advantage for the viewing user leads to an increase in the number of viewing users, and contributes to an improvement in the distribution motivation of the distribution user. In addition, since there is an opportunity to acquire new fans, it is extremely advantageous to have the distribution user purchase the gift pass.

In addition, in a case where unlimited sending is distributed (in a case where the viewing user acquires the gift pass), there is an advantage that the viewing user is capable of encouraging the distribution user whom the viewing user supports by filling the video of the distribution user with the gifts, and there is an advantage that the distribution motivation of the distribution user is improved. In particular, since the viewing user may appeal to the distribution user whom the viewing user supports by sending many gifts, it is extremely advantageous to have the viewing user purchase the gift pass.

Third Embodiment

Subsequently, various may function executable in the distribution user terminal 100, the viewing user terminal 200, and/or the server apparatus 400, which may be provided in the information processing system 3000 according to a third embodiment in the disclosure, may be described with reference to the drawings.

As illustrated in FIG. 24, one or a plurality of computer processors provided in the information processing system 3000 according to the third embodiment of the disclosure include the distribution circuit 411, the association circuit 413, the first condition determination circuit 414, and the change screen display circuit 415.

The distribution circuit 411 may transmit the information relevant to the video including the character object of the distribution user to the viewing user terminal 200 to display the video on the viewing user terminal 200.

The first condition determination circuit 414 may determine whether the first specific condition relevant to the distribution user is satisfied.

Satisfaction of the first specific condition may occur when the specific electronic medium is associated with the user information.

The specific electronic medium and the specific display may be as described above.

In a case where the first condition determination circuit 414 determines that the first specific condition is satisfied, the change screen display circuit 415 may display the change screen described above on the distribution user terminal of the distribution user.

The change screen may be a screen for changing the predetermined part to another part in which a part of the predetermined part is changed.

In this case, the predetermined part may be a part selected by the user from the parts displayed on the closet screen.

Then, association circuit 413 may associate another part changed based on the input of the distribution user with respect to the change screen with the user information, and may cancel the association of the predetermined part with the user information.

As described above, the third embodiment may be an embodiment not including the limitation relevant to the predetermined part in the first embodiment. Specifically, the user may be capable of performing the change described above with respect to all the parts displayed on the closet screen (the parts provided without any charge and the parts acquired by the gatcha or the purchase).

Note that each of the first embodiment, the second embodiment, and the third embodiment can be combined. In this case, one or a plurality of computer processors in the disclosure may include all the constituents illustrated in FIG. 24.

Note that it has been described that the "specific electronic medium" may be purchased by the user, but the specific electronic medium may be given by the event, the gatcha, and/or the login bonus.

In addition, it has been described that the "part" is wearable by the character object, but the part may be a non-wearable part (item).

Subsequently, an example of an information processing method in the embodiments of the disclosure may be described.

The information processing method in the embodiments of the disclosure may be an information processing method in the information processing system 3000 illustrated in FIG. 3. The information processing system 3000 may include one or more distribution user terminals 100, the viewing user terminal 200, and the server apparatus 400.

Figure 25:
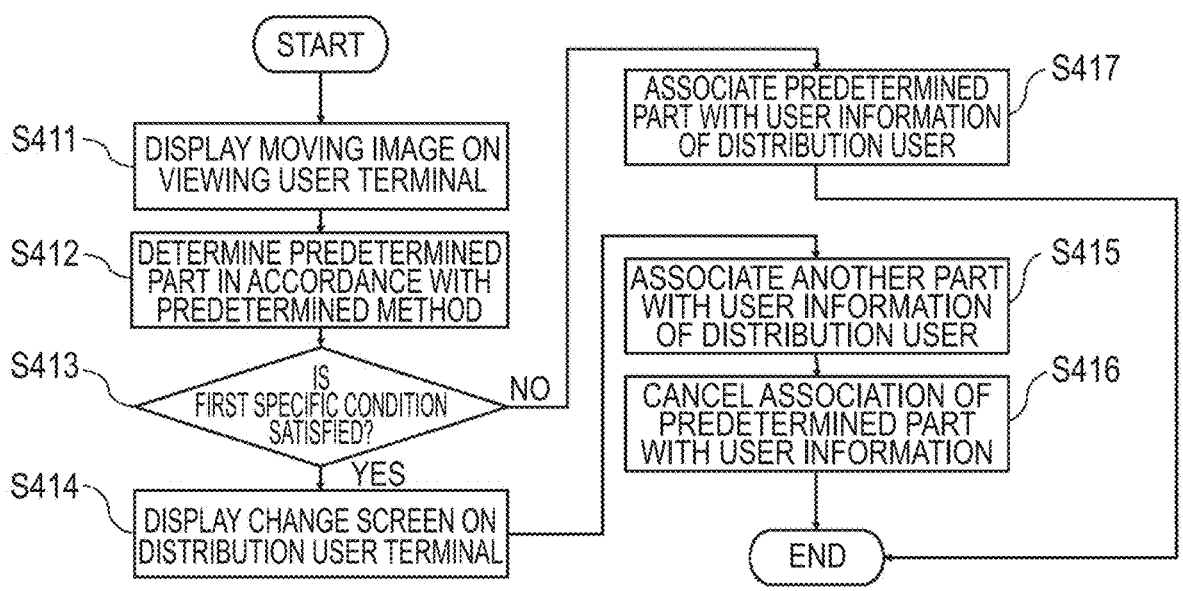
FIG. 25 is a flowchart illustrating an example of a flow of an information processing method in the disclosure.

As illustrated in FIG. 25 as an example, the information processing method in the disclosure may allow one or a plurality of computer processors provided in the information processing system 3000 to execute a distribution step S411, a determination step S412, a first condition determination step S413, a change screen display step S414, and association steps S415, S416, and S417.

In the distribution step S411, the information relevant to the video including the character object of the distribution user may be transmitted to the viewing user terminal, and thus, the video may be displayed on the viewing user terminal. Such a distribution step S411 can be executed by the distribution circuit 411 described above.

The distribution step S411 may be executed on a server side (the server apparatus 400), or may be executed on a client side (the distribution user terminal 100).

In the determination step S412, the predetermined part may be determined from the plurality of parts wearable by the character object in accordance with the predetermined method, based on the input of the distribution user. Such a determination step S412 can be executed by the determination circuit 412 described above.

The determination step S412 may be executed on the server side (the server apparatus 400), or may be executed on the client side (the distribution user terminal 100).

In the first condition determination step S413, whether the first specific condition relevant to the distribution user is satisfied may be determined. Such a first condition determination step S413 can be executed by the first condition determination circuit 414 described above.

The first condition determination step S413 may be executed on the server side (the server apparatus 400), or may be executed on the client side (the distribution user terminal 100).

In the change screen display step S414, the change screen for changing the predetermined part determined in the determination step S412 to another part in which a part of the predetermined part is changed may be displayed on the distribution user terminal of the distribution user in a case where it is determined that the first specific condition is satisfied in the first condition determination step S413. Such a change screen display step S414 can be executed by the change screen display circuit 415 described above.

The change screen display step S414 may be executed on the server side (the server apparatus 400), or may be executed on the client side (the distribution user terminal 100).

In the association steps S415 and S416, another part changed based on the input of the distribution user with respect to the change screen may be associated with the user information (S415), and the association of the predetermined part with the user information may be canceled (S416). Such association steps S415 and S416 can be executed by the association circuit 413 described above.

The association steps S415 and S416 may be executed on the server side (the server apparatus 400), or may be executed on the client side (the distribution user terminal 100).

In a case where it is determined that the first specific condition is not satisfied in the first condition determination step S413, in the association step S417, the predetermined part determined in the determination step S412 may be associated with the user information of the distribution user. Such an association step S417 can be executed by the association circuit 413 described above.

The association step S417 may be executed on the server side (the server apparatus 400), or may be executed on the client side (the distribution user terminal 100).

Then, the satisfaction of the first specific condition can be that the specific electronic medium is associated with the user information.

The specific electronic medium may be as described above.

According to the configuration described above, it is possible to provide a technical improvement for solving or lessening at least a part of the problems of the related art described above. Specifically, according to the configuration described above, it is possible to facilitate simpler and more intuitive acquisition of the parts.

Subsequently, another example of the information processing method in the embodiments of the disclosure may be described.

The information processing method in the embodiments of the disclosure is an information processing method in the information processing system 3000 illustrated in FIG. 3. The information processing system 3000 may include one or more distribution user terminals 100, the viewing user terminal 200, and the server apparatus 400.

Figure 26:
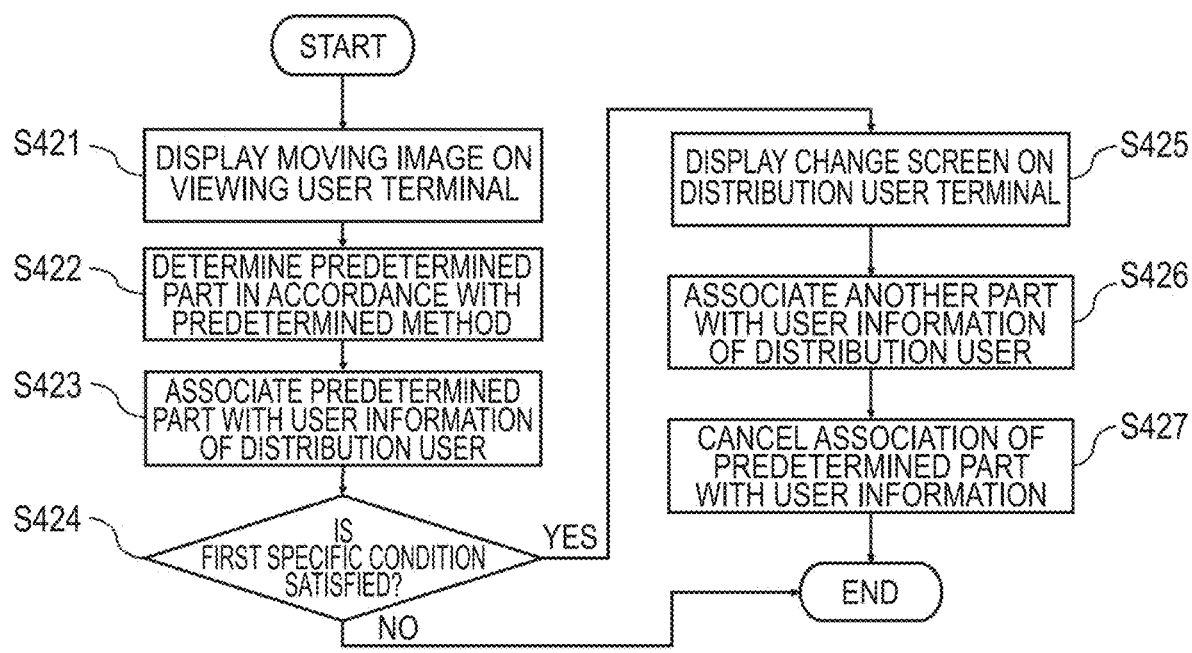
FIG. 26 is a flowchart illustrating another example of the flow of the information processing method in the disclosure.

As illustrated in FIG. 26 as an example, the information processing method in the disclosure may allow one or a plurality of computer processors provided in the information processing system 3000 to execute a distribution step S421, a determination step S422, a first condition determination step S424, a change screen display step S425, and association steps S423, S426, and S427.

In the distribution step S421, the information relevant to the video including the character object of the distribution user may be transmitted to the viewing user terminal, and thus, the video is displayed on the viewing user terminal. Such a distribution step S411 can be executed by the distribution circuit 411 described above.

The distribution step S411 may be executed on the server side (the server apparatus 400), or may be executed on the client side (the distribution user terminal 100).

In the determination step S422, the predetermined part may be determined from the plurality of parts wearable by the character object in accordance with the predetermined method, based on the input of the distribution user. Such a determination step S412 can be executed by the determination circuit 412 described above.

The determination step S412 may be executed on the server side (the server apparatus 400), or may be executed on the client side (the distribution user terminal 100).

In the association step S423, the predetermined part determined in the determination step S412 may be associated with the user information of the distribution user. Such an association step S423 can be executed by the association circuit 413 described above.

The association step S423 may be executed on the server side (the server apparatus 400), or may be executed on the client side (the distribution user terminal 100).

In the first condition determination step S424, whether the first specific condition relevant to the distribution user is satisfied is determined. Such a first condition determination step S424 can be executed by the first condition determination circuit 414 described above.

The first condition determination step S424 may be executed on the server side (the server apparatus 400), or may be executed on the client side (the distribution user terminal 100).

In the change screen display step S425, the change screen for changing the predetermined part associated by the association step S423 to another part in which a part of the predetermined part is changed may be displayed on the distribution user terminal of the distribution user in a case where it is determined that the first specific condition is satisfied in the first condition determination step S424. Such a change screen display step S425 can be executed by the change screen display circuit 415 described above.

The change screen display step S425 may be executed on the server side (the server apparatus 400), or may be executed on the client side (the distribution user terminal 100).

In the association steps S426 and S427, another part changed based on the input of the distribution user with respect to the change screen may be associated with the user information (S426), and the association of the predetermined part with the user information may be canceled (S427). Such association steps S426 and S427 can be executed by the association circuit 413 described above.

The association steps S426 and S427 may be executed on the server side (the server apparatus 400), or may be executed on the client side (the distribution user terminal 100).

In a case where it is determined that the first specific condition is not satisfied in the first condition determination step S424, this processing flow may end.

Then, satisfaction of the first specific condition may occur when the specific electronic medium is associated with the user information.

The specific electronic medium may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

Subsequently, a computer program in the embodiments of the disclosure will be described.

As illustrated in FIG. 3, the computer program in the embodiments of the disclosure may be a computer program to be executed in the information processing system 3000 that may distribute the video. The information processing system 3000 may include one or more distribution user terminals 100, the viewing user terminal 200, and the server apparatus 400.

The computer program in the disclosure may allow one or a plurality of computer processors provided in the information processing system 3000 to attain a distribution function, a determination function, an association function, a first condition determination function, and a change screen display function.

The distribution function may transmit the information relevant to the video including the character object of the distribution user to the viewing user terminal to display the video on the viewing user terminal.

The determination function may determine the predetermined part from the plurality of parts wearable by the character object in accordance with the predetermined method, based on the input of the distribution user.

The association function may associate the predetermined part determined by the determination function with the user information of the distribution user.

The first condition determination function may determine whether the first specific condition relevant to the distribution user is satisfied.

The change screen display function may display the change screen for changing the predetermined part determined by the determination function or the predetermined part associated by the association function to another part in which a part of the predetermined part is changed on the distribution user terminal of the distribution user in a case where the first condition determination function may determine that the first specific condition is satisfied.

The association function may associate another part changed based on the input of the distribution user with respect to the change screen with the user information, and may cancel the association of the predetermined part with the user information.

Satisfaction of the first specific condition may occur when the specific electronic medium is associated with the user information.

Figure 27:
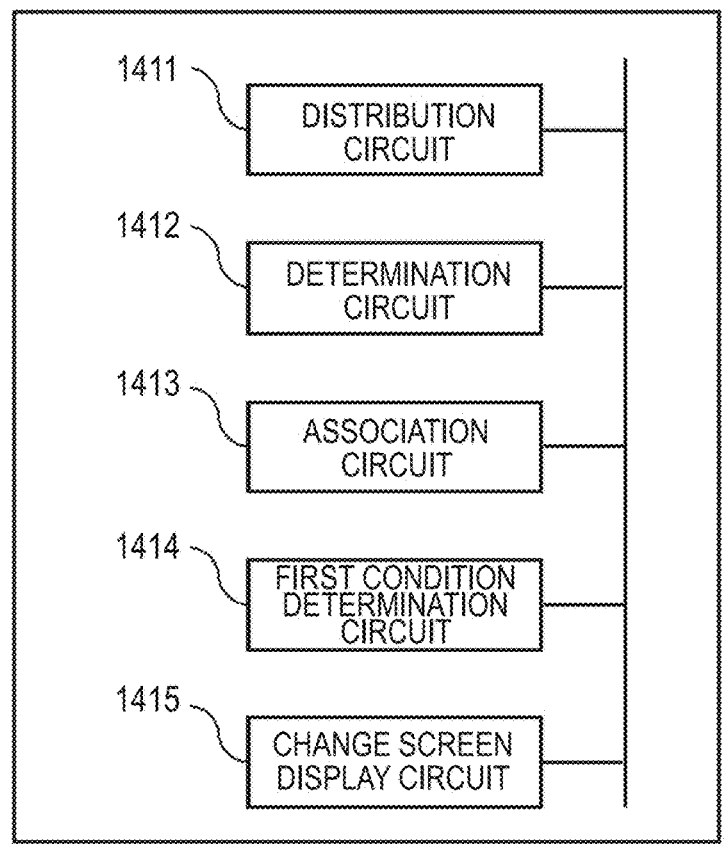
FIG. 27 is a circuit configuration diagram illustrating an example of a circuit configuration for attaining a computer program in the disclosure.

The functions described above can be attained by a distribution circuit 1411, a determination circuit 1412, an association circuit 1413, a first condition determination circuit 1414, and a change screen display circuit 1415 illustrated in FIG. 27. The distribution circuit 1411, the determination circuit 1412, the association circuit 1413, the first condition determination circuit 1414, and the change screen display circuit 1415 may be attained by the distribution circuit 411, the determination circuit 412, the association circuit 413, the first condition determination circuit 414, and the change screen display circuit 415 described above, respectively. The details of each circuit may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

Subsequently, an information processing apparatus in the embodiments of the disclosure may be described. The information processing apparatus may correspond to the distribution user terminal 100 in the information processing system 3000 described above.

Figure 28:
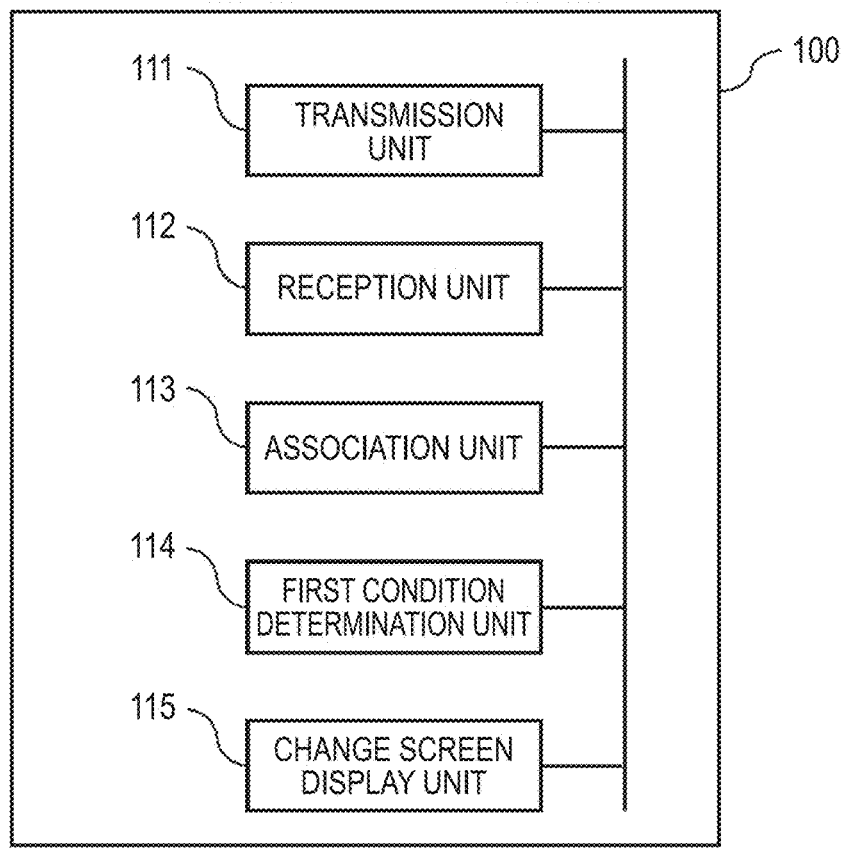
FIG. 28 is a configuration diagram illustrating an example of a function configuration of the distribution user terminal in the disclosure.

As illustrated in FIG. 28, the information processing apparatus may include a transmission circuit 111, a reception circuit 112, an association circuit 113, a first condition determination circuit 114, and a change screen display circuit 115.

The transmission circuit 111 may transmit the information relevant to the video including the character object of the distribution user and information relevant to the input of the distribution user to the server apparatus 400.

The reception circuit 112 may receive information relevant to the predetermined part determined from the plurality of parts wearable by the character object in accordance with the predetermined method, based on the input of the distribution user, from the server apparatus 400.

The association circuit 113 may associate the information relevant to the predetermined part received by the reception circuit 112 with the user information of the distribution user. The association circuit 113 may have the same configuration as that of the association circuit 413 described above.

The first condition determination circuit 114 may determine whether the first specific condition relevant to the distribution user is satisfied. The first condition determination circuit 114 may have the same configuration as that of the first condition determination circuit 414 described above.

The change screen display circuit 115 may display the change screen for changing the determined predetermined part or the predetermined part associated by the association circuit 113 to another part in which a part of the predetermined part is changed in a case where the first condition determination circuit 114 may determine that the first specific condition is satisfied. The change screen display circuit 115 may have the same configuration as that of the change screen display circuit 415 described above.

The association circuit 113 may associate another part changed based on the input of the distribution user with respect to the change screen with the user information, and may cancel the association of the predetermined part with the user information.

Then, satisfaction of the first specific condition may occur when the specific electronic medium is associated with the user information.

The specific electronic medium may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

Subsequently, an example of an information processing method in the embodiments of the disclosure may be described. Such an information processing method is an information processing method that is executed in the information processing apparatus described above (the distribution user terminal 100).

Figure 29:
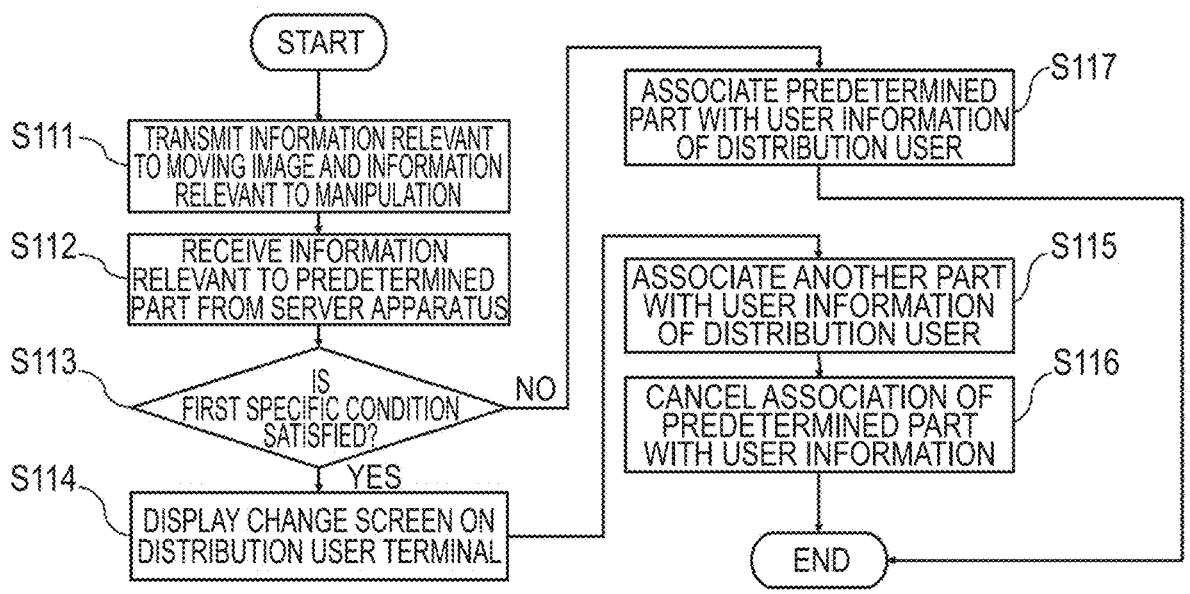
FIG. 29 is a flowchart illustrating an example of a flow of an information processing method in the distribution user terminal in the disclosure.

As illustrated in FIG. 29 as an example, the information processing method in the disclosure may allow one or a plurality of computer processors provided in the information processing apparatus to execute a transmission step S111, a reception step S112, a first condition determination step S113, a change screen display step S114, and association steps S115, S116, and S117.

In the transmission step S111, the information relevant to the video including the character object of the distribution user and the information relevant to the input of the distribution user may be transmitted to the server apparatus 400. Such a transmission step S111 can be executed by the transmission circuit 111 described above.

In the reception step S112, the information relevant to the predetermined part determined from the plurality of parts wearable by the character object in accordance with the predetermined method, based on the input of the distribution user, may be received from the server apparatus 400. Such a reception step S112 can be executed by the reception circuit 112 described above.

In the first condition determination step S113, whether the first specific condition relevant to the distribution user is satisfied is determined. Such a first condition determination step S113 can be executed by the first condition determination circuit 114 described above.

In the change screen display step S114, the change screen for changing the determined predetermined part to another part in which a part of the predetermined part is changed may be displayed in a case where it is determined that the first specific condition is satisfied in the first condition determination step S113. Such a change screen display step S114 can be executed by the change screen display circuit 115 described above.

In the association steps S115 and S116, another part changed based on the input of the distribution user with respect to the change screen may be associated with the user information, and the association of the predetermined part with the user information may be canceled. Such association steps S115 and S116 can be executed by the association circuit 113 described above.

In a case where it is determined that the first specific condition is not satisfied in the first condition determination step S113, in the association step S117, the determined predetermined part may be associated with the user information of the distribution user. Such an association step S117 can be executed by the association circuit 113 described above.

Then, satisfaction of the first specific condition may occur when the specific electronic medium is associated with the user information.

The specific electronic medium may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

Subsequently, another example of the information processing method in the embodiments of the disclosure may be described. Such an information processing method may be an information processing method that is executed in the information processing apparatus described above (the distribution user terminal 100).

Figure 30:
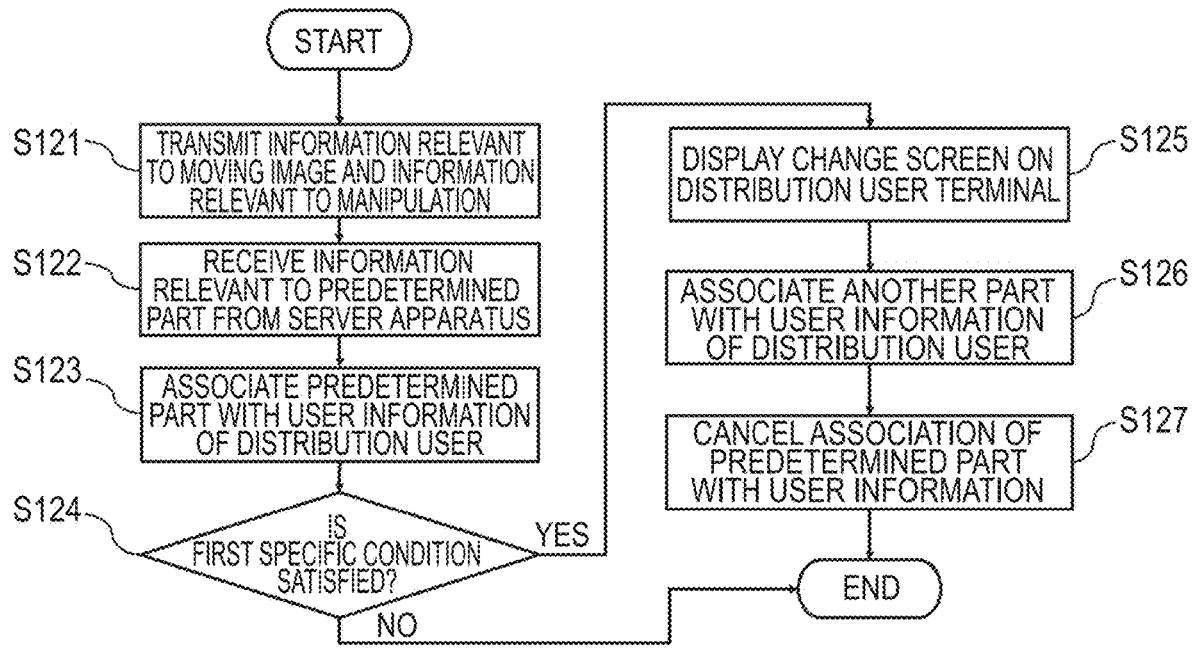
FIG. 30 is a flowchart illustrating another example of the flow of the information processing method in the distribution user terminal in the disclosure.

As illustrated in FIG. 30 as an example, the information processing method in the disclosure may allow one or a plurality of computer processors provided in the information processing apparatus to execute a transmission step S121, a reception step S122, a first condition determination step S124, a change screen display step S125, and association steps S123, S126, and S127.

In the transmission step S121, the information relevant to the video including the character object of the distribution user and the information relevant to the input of the distribution user may be transmitted to the server apparatus 400. Such a transmission step S121 can be executed by the transmission circuit 111 described above.

In the reception step S122, the information relevant to the predetermined part determined from the plurality of parts wearable by the character object in accordance with the predetermined method, based on the input of the distribution user, may be received from the server apparatus 400. Such a reception step S122 can be executed by the reception circuit 112 described above.

In the association step S123, the determined predetermined part may be associated with the user information of the distribution user. Such an association step S123 can be executed by the association circuit 113 described above.

In the first condition determination step S124, whether the first specific condition relevant to the distribution user is satisfied may be determined. Such a first condition determination step S124 can be executed by the first condition determination circuit 114 described above.

In the change screen display step S125, the change screen for changing the determined predetermined part to another part in which a part of the predetermined part is changed may be displayed in a case where it is determined that the first specific condition is satisfied in the first condition determination step. Such a change screen display step S125 can be executed by the change screen display circuit 115 described above.

In the association steps S126 and S127, another part changed based on the input of the distribution user with respect to the change screen may be associated with the user information, and the association of the predetermined part with the user information may be canceled. Such association steps S126 and S127 can be executed by the association circuit 113 described above.

Then, satisfaction of the first specific condition may occur when the specific electronic medium is associated with the user information.

The specific electronic medium may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

Finally, a computer program in the embodiments of the disclosure may be described. Such a computer program is a computer program that is executed in the information processing apparatus described above (the distribution user terminal 100).

The computer program in the disclosure may allow one or a plurality of processors provided in the information processing apparatus to attain a transmission function, a reception function, an association function, a first condition determination function, and a change screen display function.

The transmission function may transmit the information relevant to the video including the character object of the distribution user and the information relevant to the input of the distribution user to the server apparatus 400.

The reception function may receive the information relevant to the predetermined part determined from the plurality of parts wearable by the character object in accordance with the predetermined method, based on the input of the distribution user, from the server apparatus 400.

The association function may associate the information relevant to the predetermined part received by the reception function with the user information of the distribution user.

The first condition determination function may determine whether the first specific condition relevant to the distribution user is satisfied.

The change screen display function may display the change screen for changing the determined predetermined part or the predetermined part associated by the association function to another part in which a part of the predetermined part is changed in a case where the first condition determination function may determine that the first specific condition is satisfied.

The association function may associate another part changed based on the input of the distribution user with respect to the change screen with the user information, and may cancel the association of the predetermined part with the user information.

Then, satisfaction of the first specific condition may occur when the specific electronic medium is associated with the user information.

The specific electronic medium may be as described above.

Figure 31:
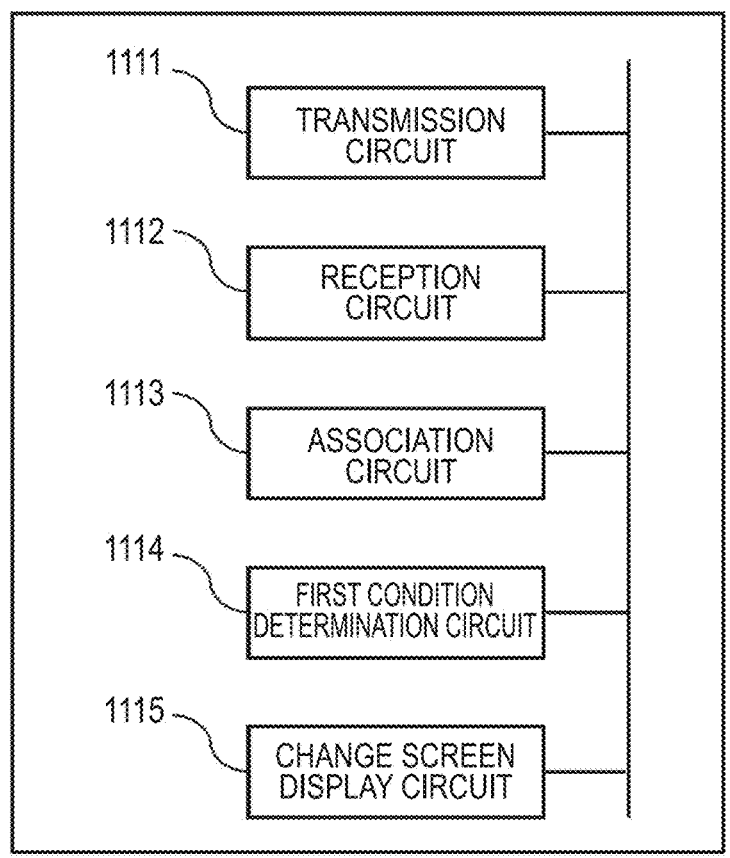
FIG. 31 is a circuit configuration diagram illustrating an example of a circuit configuration for attaining a computer program that is executed by the distribution user terminal in the disclosure.

The may function described above can be attained by a transmission circuit 1111, a reception circuit 1112, an association circuit 1113, a first condition determination circuit 1114, and a change screen display circuit 1115 illustrated in FIG. 31. The transmission circuit 1111, the reception circuit 1112, the association circuit 1113, the first condition determination circuit 1114, and the change screen display circuit 1115 may be provided by the transmission circuit 111, the reception circuit 112, the association circuit 113, the first condition determination circuit 114, and the change screen display circuit 115 described above, respectively. The details of each circuit may be as described above.

According to the configuration described above, it is possible to provide the technical improvement for solving or lessening at least a part of the problems of the related art described above. Specifically, according to the configuration described above, it is possible to facilitate simpler and more intuitive acquisition of the parts.

In addition, an information processing apparatus such as a computer or a mobile phone can be preferably used to function as the server apparatus or the terminal apparatus according to the embodiments described above. Such an information processing apparatus can be attained by storing a program describing processing contents for attaining each function of the server apparatus or the terminal apparatus according to the embodiments in a storage unit of the information processing apparatus, and reading and executing the program with a CPU of the information processing apparatus.

Several embodiments of the invention have been described, but such embodiments are presented as an example and are not intended to limit the scope of the invention. Such novel embodiments can be implemented in various other modes, and various omissions, replacements, and modifications can be made within a range not departing from the gist of the invention. Such embodiments or the modifications thereof are included in the scope or the gist of the invention, and may be included in the embodiments described in the claims and the scope equivalent thereto.

In addition, the method described in the embodiments, for example, can be stored in a recording medium such as a magnetic disk (a floppy (Registered Trademark) disk, a hard disk, and the like), and optical disk (such as a CD-ROM, a DVD, and a MO), and a semiconductor memory (such as a ROM, a RAM, and a flash memory), as a program that can be executed by a computer, and can also be transmitted and distributed by a communication medium. Note that, the program stored on the medium side also may include a setting program for configuring software means (including not only an execution program but also a table or a data structure) executed by the computer in the computer. The computer for attaining this device reads the program stored in the recording medium, and in some cases, constructs software means by the setting program, and controls the operation with the software means, thereby executing the processing described above. Note that, herein, the recording medium is not limited to a medium for distribution, and may include a storage medium such as a magnetic disk or a semiconductor memory that is provided in the computer or a device that is connected through a network. The storage unit, for example, may function as a main storage device, an auxiliary storage device, or a cache memory.

REFERENCE SIGNS LIST

100 distribution user terminal
200 viewing user terminal
300 network
400 server apparatus
411 distribution unit
412 determination unit
413 association unit
414 first condition determination unit
415 change screen display unit

The invention claimed is:
1. An information processing system comprising a memory and processing circuitry comprising one or a plurality of computer processors,
wherein the processing circuitry is configured to:
transmit information relevant to a video including a character object of a distribution user to a viewing user terminal to display the video on the viewing user terminal;
determine a predetermined part from a plurality of parts wearable by the character object in accordance with a predetermined method, based on an input of the distribution user;

associate the predetermined part determined from the plurality of parts with user information of the distribution user;

determine whether a first specific condition relevant to the distribution user is satisfied; and display a change screen for changing the predetermined part to another part, said change screen configured to cause a distribution user terminal of the distribution user to change a part of the predetermined part upon determination, by the processing circuitry, that the first specific condition is satisfied, associate the another part changed based on the input of the distribution user with respect to the change screen with the user information, and cancel the association of the predetermined part with the user information, and determine that satisfaction of the first specific condition has occurred by checking one or more electronic media owned by the distribution user, determining that a specific electronic medium is associated with the user information and is included in the one or more electronic media, and, based on an attribute of the specific electronic medium that is owned by the distribution user, determining whether to consume the specific electronic medium and remove the specific electronic medium from the one or more electronic media owned by the distribution user.

2. The information processing system according to claim 1, wherein the specific electronic medium is associated, in the information processing system, with at least one of expiration date information and use frequency information, and wherein association of the specific electronic medium with the user information comprises at least one of determining that the electronic medium is within an expiration date and that the electronic medium has not reached an upper limit of a use frequency.

3. The information processing system according to claim 1, wherein the processing circuitry is further configured to:

determine that satisfaction of the first specific condition has occurred when the specific electronic medium is associated with the user information, and specific display for displaying the change screen is selected based on the input of the distribution user.

4. The information processing system according to claim 3, wherein the specific display is a check screen of whether to display the change screen.

5. The information processing system according to claim 3, wherein the specific display is an icon for displaying the change screen.

6. The information processing system according to claim 5, wherein the processing circuitry is configured to display the predetermined part associated with the user information as a selectable element of a closet screen configured to be displayed in the video, and wherein the processing circuitry is configured to, when the predetermined part is selected on the closet screen, perform one of: initiating display of the icon in a case where the icon is not displayed, or highlighting the icon in a case where the icon is displayed.

7. The information processing system according to claim 5, wherein the predetermined part associated with the user information and the icon are configured to be displayed as selectable elements on a closet screen configured to be displayed in the video, and wherein the processing circuitry is configured to, when the icon is selected on the closet screen, display parts other than the predetermined part associated with the user information as unselectable elements.

8. The information processing system according to claim 1, wherein the processing circuitry is configured to display the another part in which a part of the predetermined part is changed as a selectable element on the change screen.

9. The information processing system according to claim 8, wherein the processing circuitry is further configured to associate further attribute information with the specific electronic medium, and wherein the processing circuitry is further configured to display the another part to which a part of the predetermined part is configured to be changed as a selectable element on the change screen, based on the further attribute information.

10. The information processing system according to claim 1, wherein the another part is a part with a color different from that of the predetermined part.

11. The information processing system according to claim 1, wherein the another part is a part in which a texture of the predetermined part is subjected to UV scroll.

12. The information processing system according to claim 1, wherein the processing circuitry is configured to, in a case when a character object of another user is included in the video, determine a predetermined part from a plurality of parts wearable by the character object of the distribution user and/or the character object of the another user in accordance with a predetermined method, based on the input of the distribution user or the another user, wherein the processing circuitry is configured to associate the predetermined part with the user information of the distribution user and/or user information of the another user, and wherein the processing circuitry is configured to associate the another part selected based on the input of the distribution user or the another user with respect to the change screen with the user information of the distribution user and/or the user information of the another user, and cancel the association of the predetermined part with the user information of the distribution user and/or the user information of the another user.

13. The information processing system according to claim 1, wherein the processing circuitry is further configured to:

receive a display request for a gift that is transmitted from the viewing user terminal;

display a gift object corresponding to the gift in the video, in accordance with the display request received for the gift transmitted from the viewing user terminal;

determine whether the gift according to the display request received for the gift transmitted from the viewing user terminal is a specific gift;

determine whether a second specific condition relevant to the distribution user or the viewing user is satisfied when the gift is determined to be the specific gift, and when the processing circuitry determines that the second specific condition is satisfied, receive the display request without reducing a point associated with the viewing user.

14. An information processing method for executing:

a transmission step of transmitting information relevant to a video including a character object of a distribution user and information relevant to an input of the distribution user to a server apparatus;

a reception step of receiving information relevant to a predetermined part determined from a plurality of parts wearable by the character object in accordance with a predetermined method, based on the input of the distribution user, from the server apparatus;

an association step of associating the information relevant to the predetermined part received in the reception step with user information of the distribution user;

a first condition determination step of determining whether a first specific condition relevant to the distribution user is satisfied; and a change screen display step of displaying a change screen for changing the determined predetermined part or the predetermined part associated in the association step to another part in which a part of the predetermined part is changed when it is determined that the first specific condition is satisfied in the first condition determination step, wherein in the association step, the another part changed based on the input of the distribution user with respect to the change screen is associated with the user information, and the association of the predetermined part with the user information is canceled, and wherein it is determined that the first specific condition is satisfied by checking one or more electronic media owned by the distribution user, determining that a specific electronic medium is associated with the user information and is included in the one or more electronic media, and, based on an attribute of the specific electronic medium that is owned by the distribution user, determining whether to consume the specific electronic medium and remove the specific electronic medium from the one or more electronic media owned by the distribution user.

15. A non-transitory computer-readable medium comprising computer program that is configured to, when executed by a processor, configure the processor to perform:

a transmission function of transmitting information relevant to a video including a character object of a distribution user and information relevant to an input of the distribution user to a server apparatus;

a reception function of receiving information relevant to a predetermined part determined from a plurality of parts wearable by the character object in accordance with a predetermined method, based on the input of the distribution user, from the server apparatus;

an association function of associating the information relevant to the predetermined part received by the reception function with user information of the distribution user;

a first condition determination function of determining whether a first specific condition relevant to the distribution user is satisfied; and a change screen display function of displaying a change screen for changing the determined predetermined part or the predetermined part associated by the association function to another part in which a part of the predetermined part is changed when the first condition determination function determines that the first specific condition is satisfied, wherein the association function associates the another part changed based on the input of the distribution user with respect to the change screen with the user information, and cancels the association of the predetermined part with the user information, and wherein it is determined that the first specific condition is satisfied by checking one or more electronic media owned by the distribution user, determining that a specific electronic medium is associated with the user information and is included in the one or more electronic media, and, based on an attribute of the specific electronic medium that is owned by the distribution user, determining whether to consume the specific electronic medium and remove the specific electronic medium from the one or more electronic media owned by the distribution user.

* * * * *